Dec. 19, 1939.  R. B. ASPINWALL ET AL  2,183,761
TORQUE CONVEYING AND CONVERTING APPARATUS
Filed Dec. 10, 1934  8 Sheets-Sheet 1

INVENTORS
*Tracy B. Tyler*
BY *Robert B. Aspinwall*
*Swan, Type & Hadeity*
ATTORNEYS.

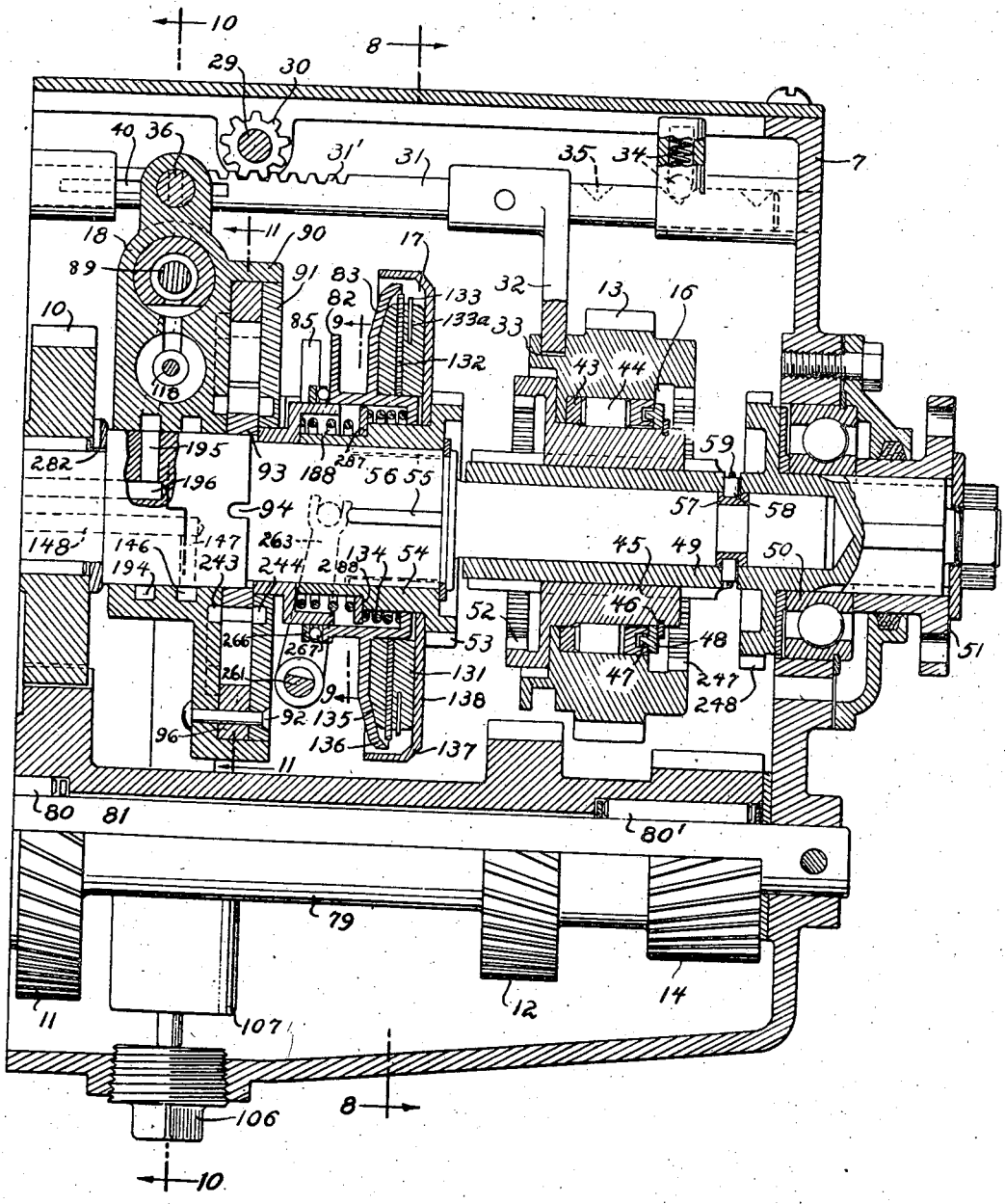

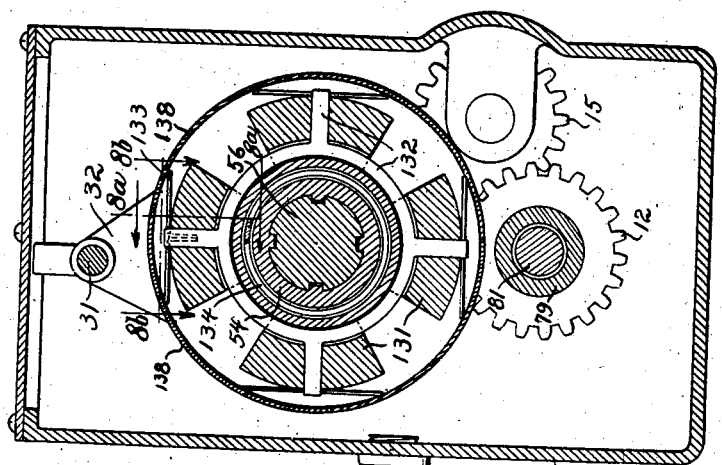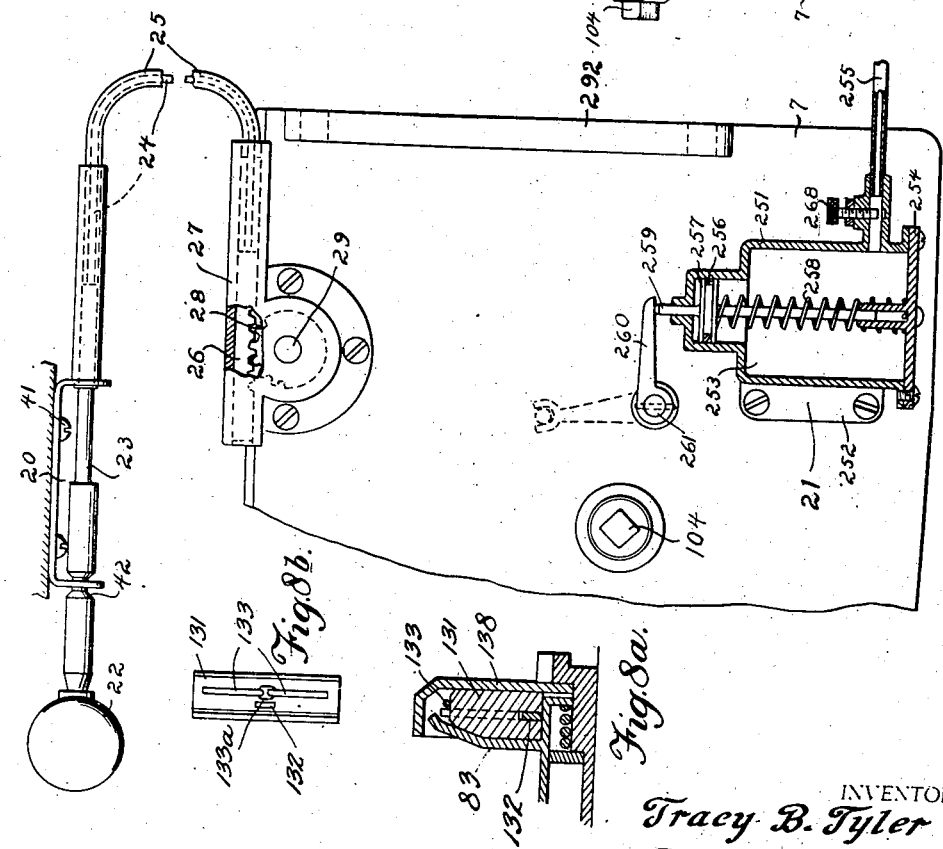

Dec. 19, 1939.      R. B. ASPINWALL ET AL      2,183,761
TORQUE CONVEYING AND CONVERTING APPARATUS
Filed Dec. 10, 1934      8 Sheets-Sheet 5
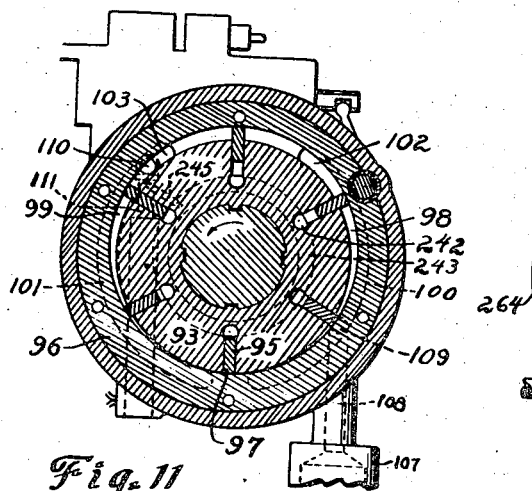
Fig. 11
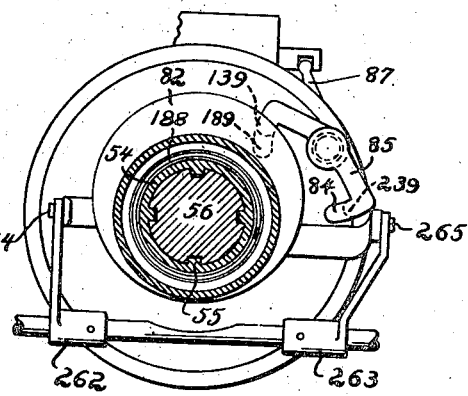
Fig. 9
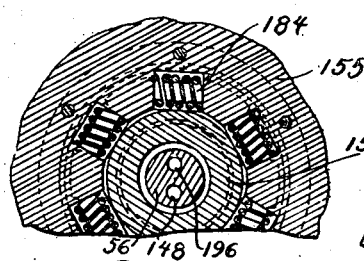
Fig. 7
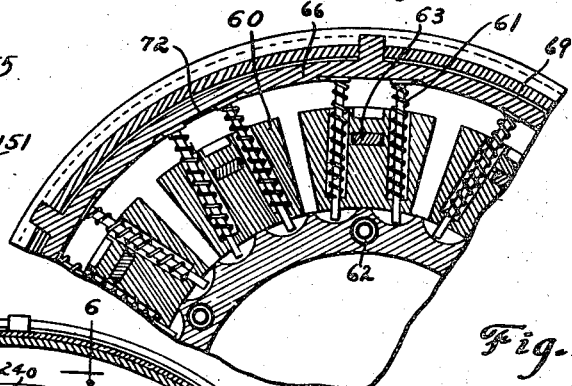
Fig. 4
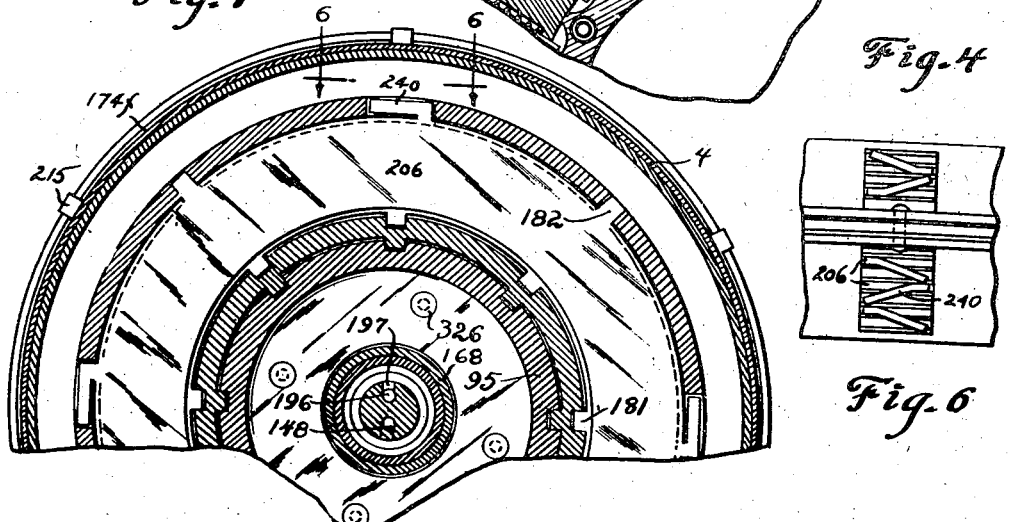
Fig. 5
Fig. 6
INVENTORS
Tracy B. Tyler
BY Robert B. Aspinwall
ATTORNEYS.

Dec. 19, 1939.  R. B. ASPINWALL ET AL  2,183,761
TORQUE CONVEYING AND CONVERTING APPARATUS
Filed Dec. 10, 1934  8 Sheets-Sheet 6

INVENTORS
Tracy B. Tyler
BY Robert B. Aspinwall
ATTORNEYS

Dec. 19, 1939. R. B. ASPINWALL ET AL 2,183,761
TORQUE CONVEYING AND CONVERTING APPARATUS
Filed Dec. 10, 1934 8 Sheets-Sheet 7

INVENTORS
TRACY B. TYLER
BY ROBERT B. ASPINWALL
Swan, Trye & Hardesty
ATTORNEYS.

Dec. 19, 1939.    R. B. ASPINWALL ET AL    2,183,761
TORQUE CONVEYING AND CONVERTING APPARATUS
Filed Dec. 10, 1934    8 Sheets-Sheet 8

INVENTORS
TRACY B. TYLER
BY  ROBERT B. ASPINWALL
ATTORNEYS

Patented Dec. 19, 1939

2,183,761

UNITED STATES PATENT OFFICE 2,183,761

TORQUE CONVEYING AND CONVERTING APPARATUS

Robert B. Aspinwall and Tracy B. Tyler, Detroit, Mich., assignors to The Monopower Corporation, Detroit, Mich., a corporation of Michigan Application December 10, 1934, Serial No. 756,900

47 Claims. (Cl. 74—336)

This invention relates to coupling and torque conveying and converting apparatus, particularly to clutching means and to mechanisms of the class commonly termed "speed change transmissions". Broadly stated, the invention aims to provide, in conjunction with such devices, improved automatic controlling means for changing the torque and speed converting ratio automatically and in response to relative speed and/or torque demands upon a source of power, and, generally, to overcome numerous disadvantages inherent in automatic clutches and transmissions as they have heretofore been designed and constructed, as well as to incorporate therein a number of improvements conducive to smooth and fool-proof operation, strength, simplicity and inexpensiveness of construction.

An important object of this invention is to provide a transmission and clutching means of the type indicated, arranged to act cooperatively and constructed in the form of compact and separable units which are separately accessible and disassemblable.

Another object of the invention is to eliminate entirely the need for a clutch pedal, which, in conjunction with the elimination of gear shifting on the part of the operator, greatly simplifies the operation of a motor vehicle.

A further object of the invention is the provision of such an automatic automotive transmission which provides for an uninterrupted flow of power from the engine to the rear wheels while ratio changing is in progress, eliminating all hesitation and loss of power, speed and time, and waste of fuel, such as are caused by shifting when conventional transmissions are used wherein it is necessary to interrupt the power flow while changing from one torque ratio to another. An incidental object flowing from that lastmentioned is the provision of a transmission enabling faster acceleration of a vehicle, by completely eliminating the unavoidable deceleration which occurs when it is necessary to disconnect the drive as when shifting in the ordinary manner.

Still another object is the provision of such an automatic transmission in which shifting may be effected smoothly and silently regardless of the speed of the vehicle and the skill of the driver.

A still further object is the provision of improved means, directly controllable by the operator of a vehicle equipped with a transmission constructed in accordance with our invention, whereby the speed or torque ratios may be directly controlled independently of the automatic shifting means, with or without interruption of power flow, yet clashing, noise or jerks in shifting or injury to working parts through unskillful operation of such controlling means is impossible.

This invention also aims to improve upon the automatic transmission construction disclosed in the copending application of Robert B. Aspinwall, Serial No. 706,232, filed January 11, 1934, to eliminate the necessity of providing a separate main clutch, and to incorporate improved automatic clutching means and personally controllable shifting means, as well as to improve said transmission in other respects which will become apparent as the description proceeds.

Still another object is to incorporate in a compact unitary assembly improved wet and dry clutches, and centrifugal and power-operated clutches, arranged to act cooperatively and assembled in one unit, yet in which the wet and dry clutches are completely isolated from one another and leakage of liquid into the latter is impossible.

Another object of the invention is to provide in such mechanism novel means for effectively reducing heat generation and for rapidly dissipating such heat as is unavoidably produced.

Another object is a means for automatically effecting a driving connection between any power generator and mechanism to be driven thereby, where high torque conditions are necessary before direct drive conditions are established, as for example the driving of machines from electric motors not provided with special windings or other accessories.

Other objects include the provision of improved liquid sealing and conducting means, improved fluid pumping and controlling mechanism, a novel manner of floating certain of said pumping and controlling apparatus upon a rotating shaft within the transmission casing, and of manifolding certain of the fluid channels, novel and extremely compact centrifugal governing means, an improved fluid regulating system responsive to such centrifugal governing means, and simple and positive means for destroying effectiveness of the fluid controlling means during reverse operation of the transmission.

Other objects worthy of specific mention are, to improve centrifugal clutch constructions, in respects not only eliminating "grabbing" and "chatter", but providing greater ruggedness and longer life, and which further maintain the dynamic balance of the rotating parts in a novel manner, and also to provide for uniform application, uniform increase of clutch pressure, and a predetermined maximum clutch pressure, throughout the range of operation of the applying means.

Other objects and advantages will be apparent from the following description, wherein reference is made to the accompanying drawings illustrating preferred embodiments of our invention, and wherein similar reference numerals designate similar parts throughout the several views.

In the drawings:

Figures 2a and 2b are enlarged substantially central vertical sectional elevations of different portions of the device, one view forming a continuation of the other.

Figure 3 is a fragmentary side elevation of an opposite side of the device from that shown in Figure 1, sectionally showing part of the automatic governing apparatus and a connected manually operable control assembly.

Figure 4 is a fragmentary cross section of a part of the centrifugal clutch operating means, taken substantially on the line 4—4 of Figure 2a and looking in the direction of the arrows.

Figure 5 is a fragmentary section taken substantially on the line 5—5 of Figure 2a and looking in the direction of the arrows.

Figure 6 is a fragmentary edge view of certain of the clutch plates taken as indicated by the line 6—6 of Figure 5 and looking in the direction of the arrows.

Figure 7 is a fragmentary cross section of the hub portions of the wet clutches, taken substantially on the line 7—7 of Figure 2a and looking in the direction of the arrows.

Figure 8 is a vertical cross section taken substantially on the line 8—8 of Figure 2b and looking in the direction of the arrows.

Figure 8a is a sectional detail taken substantially on the line 8a—8a of Figure 8 and looking in the direction of the arrows.

Figure 8b is a sectional view taken substantially on the line 8b—8b and looking in the direction of the arrows, the outer bells of the governor assembly being removed to show one of the fly-weights, and the spring means therefor, in plan.

Figure 9 is a vertical cross section taken substantially on the line 9—9 of Figure 2b and looking in the direction of the arrows.

Figure 11 is a vertical cross section taken on the line 11—11 of Figure 2b and looking in the direction of the arrows.

Figures 10, 12, 13:
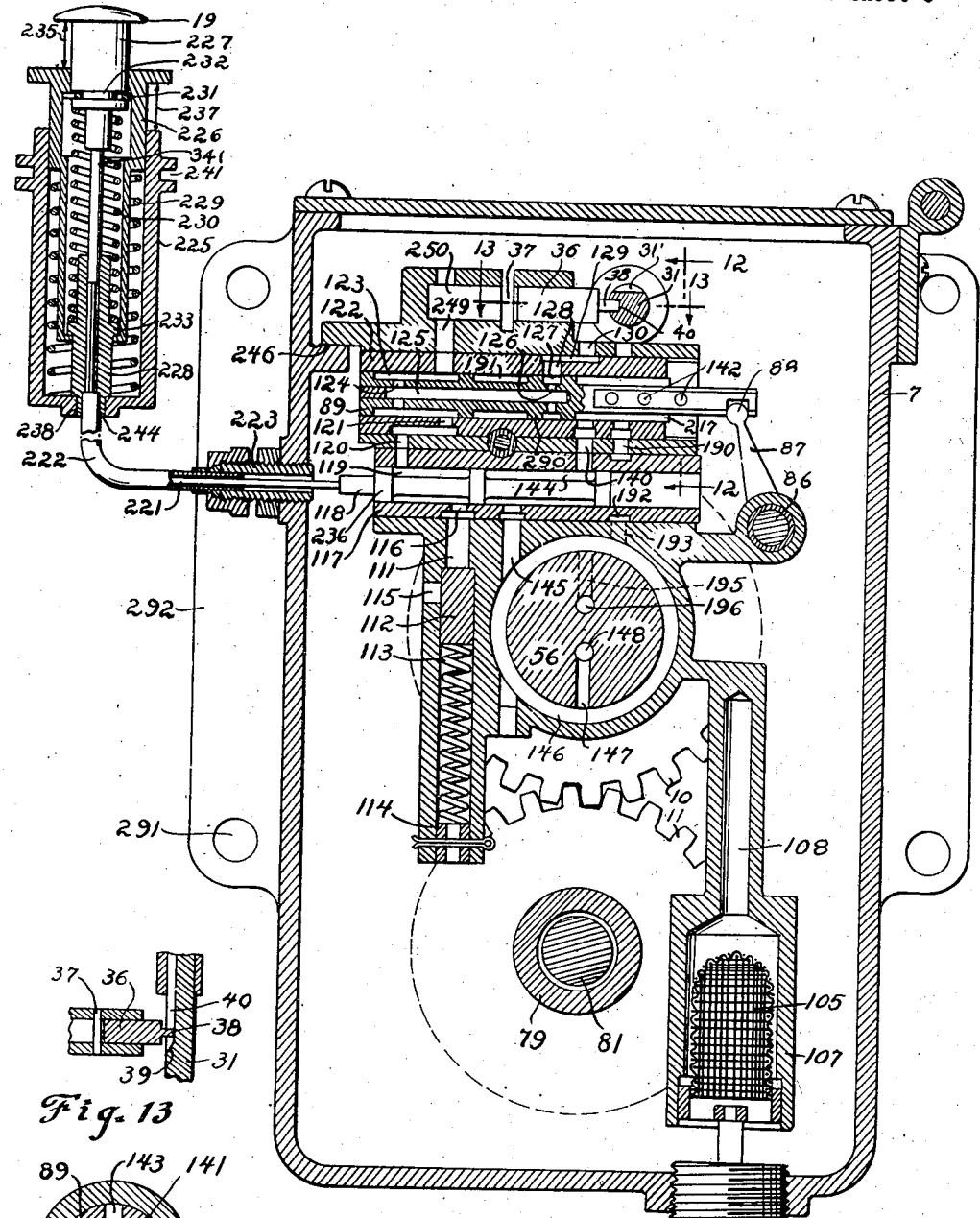
Figure 10 is a vertical cross section taken substantially on the line 10—10 of Figure 2b and looking in the direction of the arrows.

Figures 12 and 13 are detailed sections taken substantially on the lines 12—12 and 13—13 of Figure 10 and looking in the direction of the arrows.

Figure 2A:
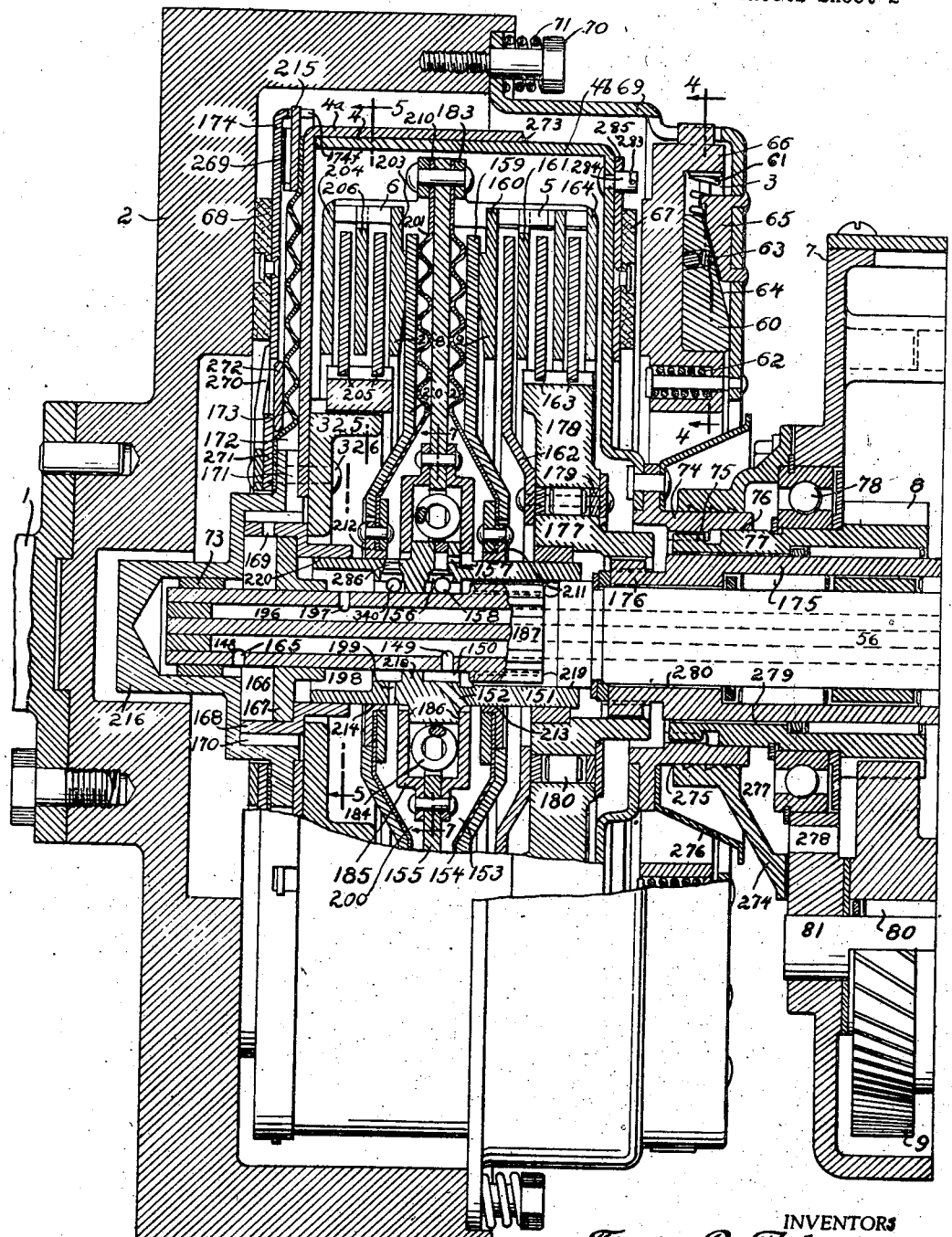
Figure 15:
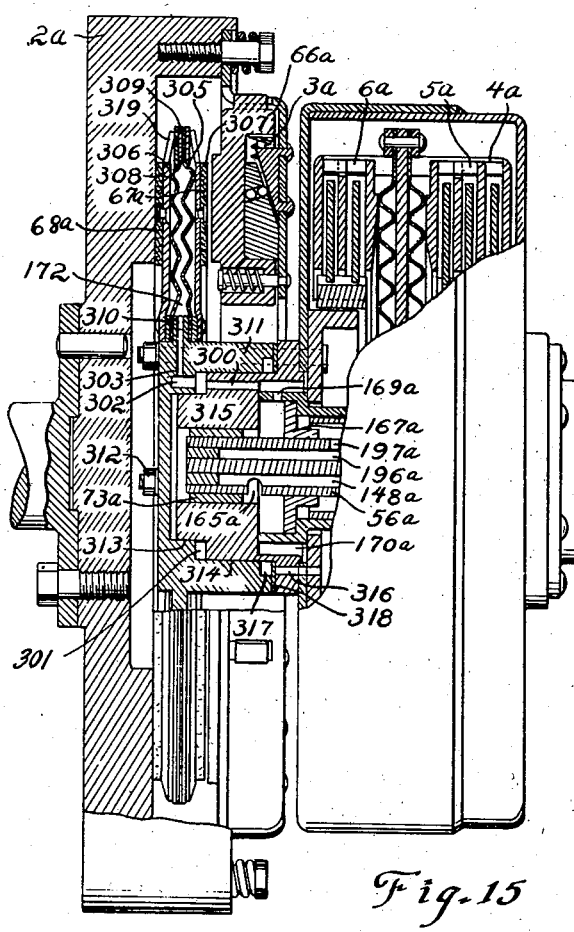
Figure 14:
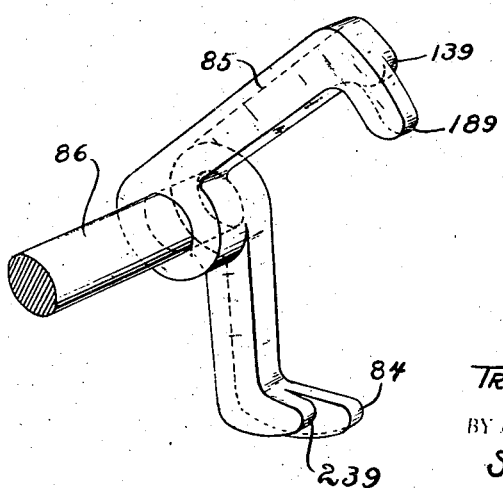

Figure 14 is a perspective of the governor controlled valve operating arm;

Figure 15 is a view similar to Figure 2a of a clutch assembly of somewhat modified construction.

Figure 16:
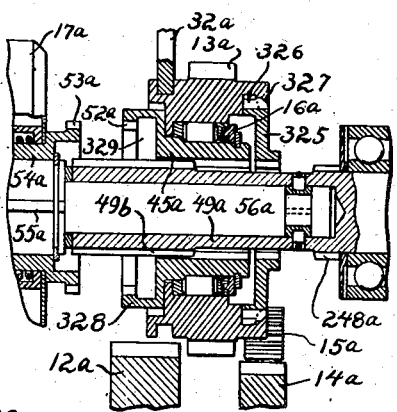

Figure 16 is a fragmentary detailed sectional elevation of a somewhat modified unitarily slidable gear and overrunning clutch assembly and cooperating parts.

Figure 17:
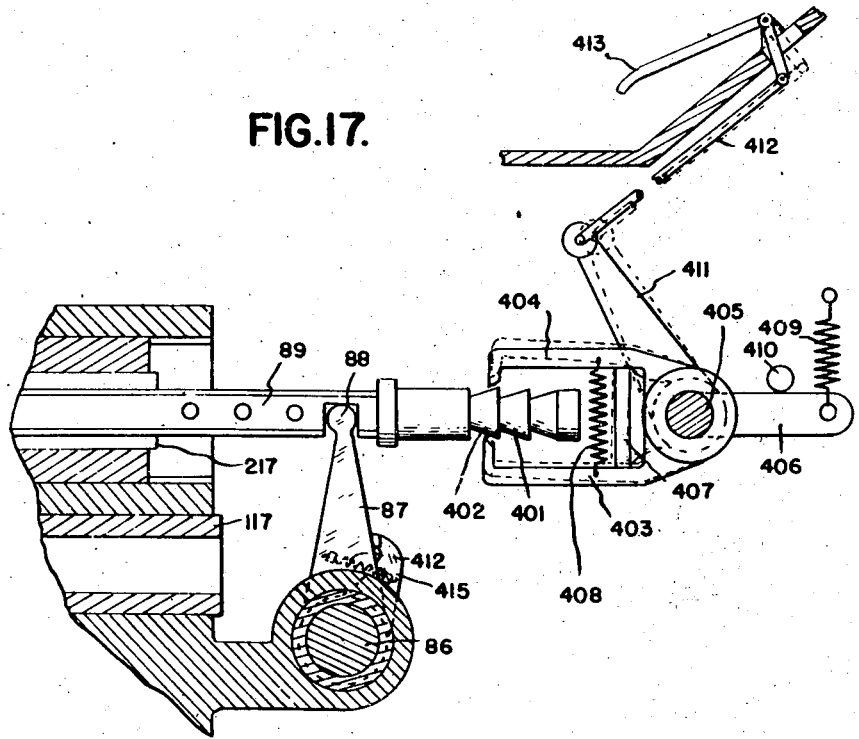

Figure 17 is a fragmentary sectional detail taken on a plane corresponding to that of Figure 10 and showing somewhat modified actuating means for the automatic control valve.

Figure 18:
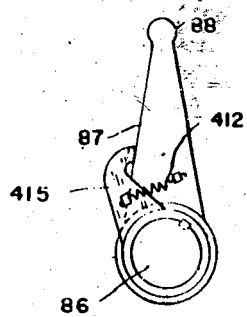

Figure 18 is a sectional detail looking in the opposite direction, showing the construction of the valve actuating arm.

THE PRINCIPAL ELEMENTS IN GENERAL

Figure 1:
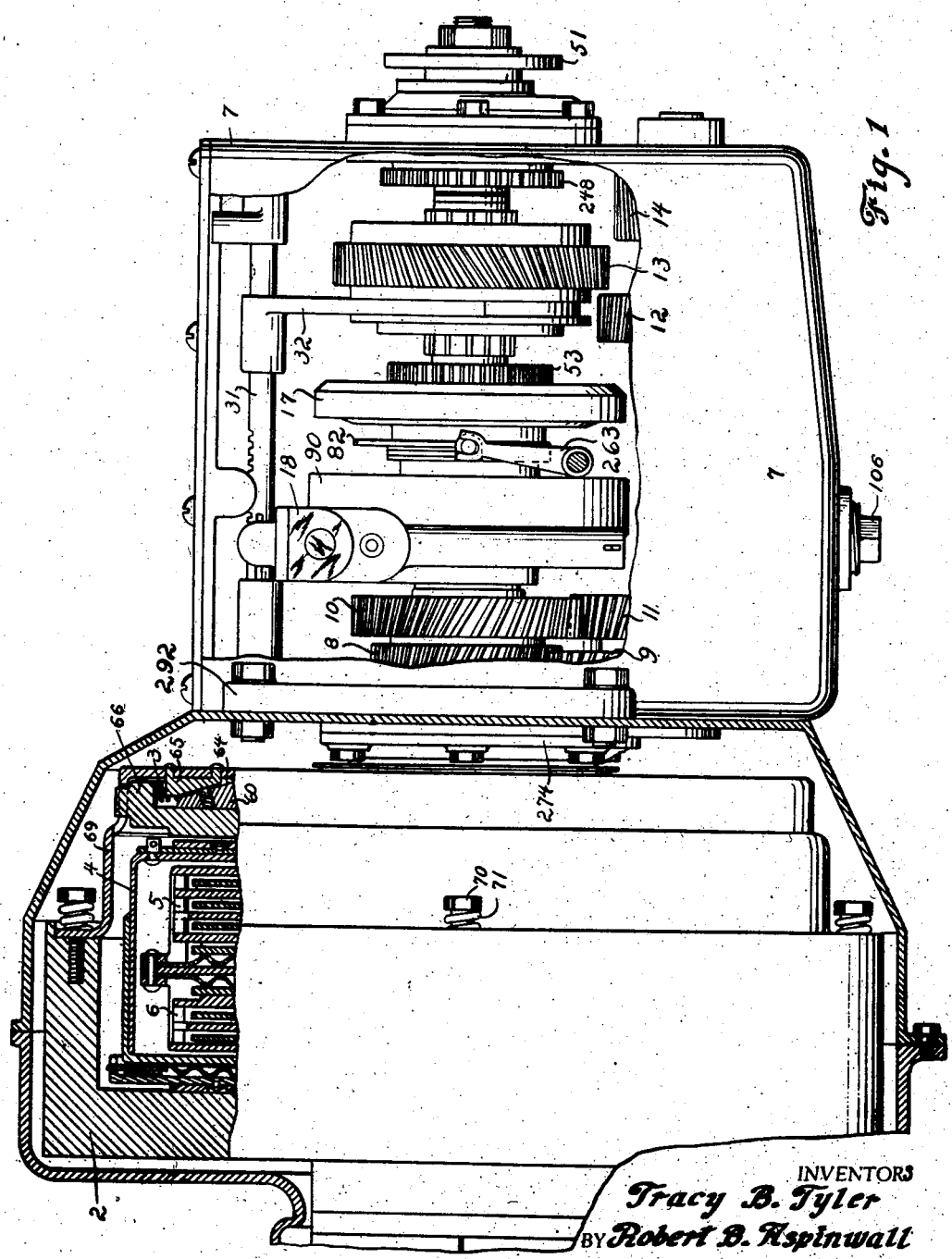
Figure 1 is an assembly view showing in side and sectional elevation and partly broken away an automatic transmission and clutches incorporating the principles of our invention and suitable for use in automotive vehicles as well as in other rotation conveying installations.

Referring now to the drawings, it will be seen that our improved apparatus is formed in two coupled sections, each section being of unitary construction. That shown at the left in Figure 1, and in its entirety in Figure 2a, constitutes the clutching assembly, while the unit at the right in Figure 1 and most of which is shown in greater detail in Figure 2b, constitutes the ratio changing and control assembly. It will be understood that Figures 2a and 2b are to be read with the latter arranged as an aligned continuation at the right of the former, so that the parts occupy the relative positions in which they are shown in Figure 1.

Reference character 1 designates the driving shaft, to which is secured the flanged flywheel portion 2, which serves to partially house the clutching means presently to be described. Carried by and cooperating with the cupped flywheel portion 2 is a belled casing portion 69 secured to the flywheel flange by cap screws 70 and forming with the flywheel a housing for main clutching means operable independently by either centrifugal force or fluid pressure means, to couple to the flywheel and driving means a driven drum 4 contained within portions 2—69. In the construction illustrated in Figures 1 and 2a, clutch facings 67, 68 are shown arranged upon opposite faces of the drum. The centrifugal operating means for the main clutch is generally designated 3, while the fluid pressure operable applying means acts in chamber 40 172 to expand diaphragm 173.

Within drum 4 are a pair of wet clutches, the rearmost of which is generally designated 5 and constitutes the intermediate speed clutch, while the similar forward assembly, designated 6, constitutes the direct drive clutch. The construction and operation of these parts will presently be set forth in detail.

Similarly generally indicating the principal elements contained within the rear casing section 7: a main gear set, 8—9, is provided (Figures 1 and 2a), an intermediate speed gear set 10—11 (Figures 1 and 2b), and a low speed gear set, 12—13, within the latter of which gears is disposed an overrunning clutch 16. A centrifugal governor assembly generally designated 17, and a pump and valve assembly 18, are mounted on transmission shaft 56. Associated with and arranged exteriorly of the casing 7 are a manually or personally operable control assembly 19 (Figure 10), a shifter control 20 (Figure 3—also manually operable) and a suction torque-responsive automatic control assembly 21.

*Gearing*

Considering now the outlined parts in greater detail, and particularly the torque converting gearing, it should be observed that the unit comprising gear 13, its hub section 45, and the interposed overrunning clutch, is mounted for slidable movement upon its supporting driven sleeve 49. The hub 45 which is splined upon the driven sleeve is drivable by the gear 13 through the interposed overrunning clutch 16, but the overrunning clutch prevents driving the gear in a forward direction by the driven sleeve. The unit comprising gear and overrunning clutch is movable by means of a shifter fork 32 carried by a slidable shifter rail 31, in which are formed rack teeth 31', drivable by gear 30 rotatable by means of operating unit 20. The operating unit is ordinarily mounted on the instrument panel in vehicular installations, and connected to the shifting means just described by means of a Bowden wire and conduit assembly 24—25. This manual control instrument panel unit will be seen to comprise a suitable supporting bracket 41 and a plunger or rod 23 operable by means of a knob 22, the plunger being of course connected to the Bowden wire 24, and suitably notched as at 42 to define the neutral position of the gear, 13. Said gear is shown in such neutral position in Figure 2b, and it will be seen that when slid to the left as viewed in that figure it may be engaged with the gear 12 to establish a forward drive connection, while when slid to the right to engage gear 13 with a reverse idler 15, a reverse drive connection is established. Movement of the gear 13 from one to another of these positions is manually effected by means of the control knob 22, which, however, need not be manipulated at all in ordinary forward operation and starting and stopping of the driven mechanism.

Gear 13 is yieldably held in whichever of these three positions it may be located, by means of a spring-pressed detent 34 cooperating with pockets 35, in the slidable shifter rail 31.

The overrunning clutch within gear 13 comprises a plurality of rollers 44 housed in pockets formed by inclined flats (undesignated) on the periphery of hub 45. Although this overrunning clutch may be formed in any desired manner, it is preferably constructed as disclosed in the copending application of Robert B. Aspinwall above referred to, the rollers 44 being caged in a bushing 43 slotted to receive them, while the bushing serves as a bearing for the annular gear portion 13 which also constitutes the driven clutch element. Torque is applied to the cage to urge the rollers toward wedged position by suitable torsion spring means (unshown) acting through a collar 48 provided with lugs 47 interfitting with the cage bushing 43, the collar and so the cage and roller assembly being retained in position by a snap ring 46. When the rollers 44 occupy the deepest portions of the flats, they do not project beyond the periphery of bushing 43, the outer gear assembly 13 being then simply journaled on the bushing, while when in wedging position the rollers are urged through the slots in the bushing and into engagement with the annular inner surface of the ring gear 13 to lock the same to the hub. The flats are so inclined that when gear 13 is driven by gear 12 to drive the vehicle or driven element in a forward direction, the clutch is thereby locked, but turning the driven shaft faster than gear 13 causes the clutch to overrun, as above indicated.

When the gear 13 is moved to the reverse (right hand) position, the overrunning clutch is rendered ineffective or inoperative by engagement of the clutch teeth 247—248, the former carried by element 13 and the latter by the driven sleeve 49, while when gear 13 is moved to the forward drive (left hand) position, the hub 45 and driven sleeve 49 are locked to the transmission shaft 56, by engagement of the clutch teeth 52—53, the former carried by the hub and the latter by the collar 54 carrying the centrifugal governor 17, which collar is keyed to the transmission shaft 56 as at 55.

The rear extremity of the transmission shaft 56 will be seen to be journaled in the driven sleeve 49, in which it is retained by pins, as 58, projecting through the sleeve and into rotatable engagement with a split collar 57 arranged in a peripheral groove (undesignated) in the shaft, the pins being retained by a snap ring 59. Sleeve 49 is in turn journaled in the rear wall of housing 7, as in the anti-friction bearing 50, and may carry at its rear extremity and outside the housing a driven coupling element 51, to which, through suitable universal or other connections (unshown) the propeller shaft of a vehicle, or other element desired to be driven (also unshown) may be coupled.

The split collar 57 will be seen to take care of the thrust of helical gears without extra bearings by providing axial connection between shaft 56 and sleeve 49.

Low speed gear 12 and reverse gear 14 are rotatable as a unit and upon countershaft 81, the gears being shown as formed integrally with a sleeve 79, and with main gear 9 and intermediate speed gear 11 also carried thereby. Such sleeve and gear assembly is shown as journaled upon the fixed countershaft by means of anti-friction bearings 80, 80'.

When the slidable assembly carrying gear 13 is in the forward drive (left hand) position previously described, the low and intermediate speed and direct drives are rendered effective or ineffective under the direct control of the clutching means contained in the assembly best shown in Figure 2a.

*The main clutch centrifugal operating means*

The centrifugal engaging elements of the main clutch, comprise slidable flyweights 60 (Figures 2a and 4) which are movable outwardly only when rotated fast enough so that their centrifugal force overcomes the resistance of springs 61, which urge the flyweights inwardly, and springs 62 which urge toward released position the clutch element 66 against which the forces generated by the flyweights react. The flyweights do not react directly against the clutch element, but serve to urge the rollers 63 trapped in the flyweights outwardly and roll them along and between the surface of clutch element 66 and the opposed inclined faces of suitably positioned cam lugs 65 secured to the inner surface of the rear bell section 69. Member 69 forms a continuation of and constitutes with element 2 an enclosure as well as driving member for the drum, and is secured to element 2 by shouldered cap screws 70, as a result of which these members turn together, but the rear section 69 will be seen to be limitedly movable axially independently of the forward flywheel section 2 against the resistance of springs 71 trapped beneath the heads of the shouldered cap screws.

Upon sufficient outward movement of the rollers 63 under the influence of the flyweights, due to increased speed of the drive shaft, pressure plate 66 is forced into engagement with a clutch facing 67 carried in opposing position by the surface of drum 4, a similar clutch facing 68 being affixed to the opposite face of the drum and adapted to be forced by such pressure into engagement with the inner face of the front casing-flywheel section 2. A spring ring 269 is shown as interposed between the drum and the pressure plate 174 by which the last mentioned clutch facing is directly carried, to cushion the engagement of the centrifugal clutch against "chatter". Driving engagement yet limited relative movement between the drum and clutch plate 174 is permitted by the loose interfitting of a notched flange 174f of plate 174 with a toothed driving ring 215, fixed, with the edge of an associate or auxiliary actuator diaphragm 173, to the drum 4, the ring and diaphragm being fixed together and to the drum, as by welding. The purpose of this auxiliary actuating means will presently appear.

The thrust reaction upon application of the clutch in the manner described is taken by the shell 69 which as previously stated is axially movable under such axial thrust in this direction, to compress the springs 71. The total combined pressure of springs 71 is equal to the maximum clutch pressure required, and the degree of movement permitted the shell by compression of these springs is sufficient to allow the flyweights to move outwardly into engagement with the inner surface of the annular chamber in member 66 in which they are housed. When stopped by this surface they are maintained in circumferential alignment, that is, equi-distant from the axis of the assembly, and so cannot upset the dynamic balance thereof. The degree of movement allowed the flyweights by reason of this arrangement and the presence of springs 71 also insures uniform and proper clutch engagement regardless of wearing away of the facings, or any inaccuracies, differences or changes in the dimensions of the parts due to wear or other cause, as the weights may always move out until either their full centrifugal force at the instant considered is effective to apply the clutch, or they are stopped by the rim flange of element 66, at which time the degree of movement is ample to apply the stress of springs 71 to the clutch despite any wear which may have occurred.

Use of the angular lugs 65 to take the reactive thrust upon application of the centrifugal clutch engaging means also permits the pressure plate 66 to be moved sufficiently far to take care of all wear without variation of the ratio of clutch pressure to centrifugal force, so that it is never necessary to adjust the clutch for wear.

The drum 4 is journaled or supported upon the projecting end of the transmission shaft 56, at the forward end on bushing 73, and at the other end is riveted or otherwise affixed to a hub 74, keyed as at 75 to a sleeve 77, which is integral with the gear 8 and journaled in the forward wall of the housing 7 in an anti-friction bearing 78. Sleeve 77 and hub 74 are closely interfitted as at 76 to provide a liquid seal. It will be seen that rotation of the drum by reason of its securance to the driving elements by the centrifugal clutching means just described revolves gear 8 and so the low speed gear 12 through gear 9, thereby transmitting the drive through gear 13 (when in forward position) and overrunning clutch 16 to the driven coupling 51.

Separate and relative adjustment of both the initial engagement speed and full engagement speed of the centrifugal clutch applying means is obtainable by varying with relation to the masses of the flyweights 60 the combined return tension of springs 61—62, which maintain the flyweights in the inner position as well as retract the thrust plate 66, and by varying the angularity of the thrust element 65. The springs 61—62 prevent outward movement of the flyweights until the driving member attains a predetermined speed. Their resistance is such as to allow sufficient idling speed for the engine, and also preferably permits the engine to attain a speed establishing reasonably high torque efficiency before incipient engagement takes place, since the torque output of an internal combustion engine is inherently low at low speed. This idling speed is also preferably so adjusted as to be sufficient, particularly in winter, to allow warming up the engine at more than normal idling speed without instituting incipient clutch engagement and starting the driven element or vehicle. It will be understood however that if it is desired to race the engine without driving the car or driven element, it is only necessary to shift the assembly 13 to the neutral position, (in which it is shown in Figure 2b), thus unmeshing the gear 13 as well as disconnecting the driven sleeve 49 from the shaft 56.

*The wet clutches*

The low speed drive is maintained so long as the clutches 5 and 6 remain disengaged. Engagement and disengagement of such clutches is effected by a fluid medium (such as oil) under the control of governing means presently to be described. The clutches themselves are shown as of the multiple disc type. Clutch 5 will be seen to be made up of driven plates 161, keyed to the common driven web 155 of both clutches 5, 6. The plates are rotatable with and axially movable relatively to the web in the well known manner. Driving plates 163 are similarly keyed to a collar 178. A sub-pressure plate 160 is grouped and keyed with plates 161 and movable by fluid means presently to be described to engage the clutch, by clamping together the plates 161—163 to lock the web 155 to the collar 178.

Collar 178 constitutes the driven member of an overrunning clutch, the rollers 180 of which are trapped in a cage 179 which also rotatably supports collar 178 when the latter is running free. Element 178 is drivable through rollers 180 by a central drive hub 177, which is keyed as at 176 to a sleeve 175 rotatable on the driven shaft and rigidly carrying within the housing 7 the second speed gear 10. The central web 155, constituting the driven portion of clutch 5 as well as of clutch 6, is supported by and connected to a hub 151 which is in turn keyed as at 187 to the transmission shaft 56. It will accordingly be seen that when clutch 5 is engaged, (the main clutch of course being also engaged so that drive is imparted to the drum) a second speed drive is established which may be traced from drive shaft 1 and casing 2—69 through the main clutch and drum 4 to sleeve 77, through gears 8, 9, 11 and 10, overrunning clutch 179, which locks when its driving portion 177 is turned faster than portion 178 would otherwise turn, thence through clutch 5 and driven web 155 to the transmission shaft, which being then turned faster than gear 13, causes overrunning clutch 16 in the hub of that gear to release and overrun. Driven sleeve and coupling 49—51 being clutched to shaft 56 through teeth 52—53, the second speed drive is completed in the manner described, upon the engagement of clutch 5. Such drive picks up the driven sleeve without any necessity for disengaging the low speed drive, which is immediately rendered ineffective by the overrunning clutch 16.

The driving connection between the driven web plate 155 and the driven shaft is preferably a resilient one. Cushioning is effected by means of a plurality of coil springs 184, (Figures 2a and 7) trapped in windows in the central portion of the web plate proportioned to receive them. The edges of such windows drive the springs, which in turn drive the hub 151 which is provided with a projecting portion 186 cooperatively slotted to receive the springs and the drive transmitted therethrough. The springs are held in position by an annular housing formed by cupped flanges 185 secured to the opposite sides of the web plate 155 and projecting beside the springs, as well as into sealing engagement with the sides of portion 186. The portions 185 will be seen to thus provide sealing means against cross-communication between chambers 153, 200.

Clutch 6 will be seen to be similar in construction to clutch 5, the driven plates 203—204—206 being similarly keyed to the same driven web 155 and arranged to cooperate with similarly interfitted driving plates 205, which are in turn keyed to the driving hub 325 secured to drum 4 by rivets 326. Element 325 is formed in two parts, shown as splined together, for purposes of assembly. It will be apparent that upon engagement of clutch 6, the driven web 155 is directly coupled to the drum and turned therewith, the drum being in turn clutched to the drive shaft as an element of the main clutch, and driven web 155 being directly connected to the driven shaft at 187, direct drive is established.

The fluid actuating means allows disengagement of clutch 5 upon engaging clutch 6, and it will be seen that one of the driving plates 162 of clutch 5 is secured to the roller cage of the overrunning clutch which is interposed between driving hub 177 and the clutch 5. The rollers, and accordingly plate 162, are capable of only limited circumferential movement with respect to the hub 177. The drag of the plate 162 in the drum urges the rollers towards wedged position, thus eliminating necessity for a torsion spring in the overrunning clutch, while the use of such overrunning clutch prevents turning the remaining driving plates 161 when clutch 5 is disengaged, eliminating the heat generation and power loss from friction drag normally inherent in multiple disc clutches from the plates rubbing against each other or rotating through a liquid when running free—only the plate 162 being rotated relatively to the others when the clutch is disengaged. Plate 162 generates very little heat while running free, yet has sufficient capacity to hold a vehicle against coasting on hills, since with clutch 5 engaged plate 162 resists forward coasting of the vehicle in second gear, but the capacity is assumed to be insufficient to transmit the full driving torque of the engine without excessive engagement pressure. If, however, the torque to be passed did not require the use of more than a single plate, the overrunning clutch could of course be eliminated.

The clutches 5 and 6 are urged toward released position by spring portions 240 which are formed as integral laterally bent prongs on the peripheries of the plates 160, 163 and 206. These spring tongues, as best shown in Figure 6, are bent in opposite directions on adjacent plates, so that the point of each tongue abuts the heel of the next, and yieldably space the plates at desired intervals, acting to return the clutches to released position when the pressure is released.

Air cooling means for its mechanism is also provided by the arrangement of the multiple clutch assembly. One of the prime reasons for so constructing this device as to isolate the clutching elements from the torque changing elements is to eliminate the heat generated by the rotation of an assembly of such necessarily large diameter in a heavy fluid medium. By rotation in air the heat naturally generated by engagement of the clutches under load is rapidly dissipated.

*Controlling means for fluid-operable clutches*

Primary control of automatic shifting is effected by centrifugal governing means 17, by which the operation of the fluid actuable clutches is controlled through valving apparatus presently to be described. A belled sheet metal portion 138 is mounted on the driven shaft 56 and rotatable therewith within the housing 7, together with an opposed and relatively slidable interfitted bell portion 83. Such opposed bell sections have convergent tapered portions near their peripheries and enclose radially slidable flyweights 131. The angularity of the inclined outer thrust portions of flyweights 131 and of the bell 83 increases in steps, as at 135, 136. The flyweights are normally urged inwardly by springs 133, as well as by springs 134—188 (Figure 2b) and are retained in suitably spaced relation by a pronged guide ring 132, the prongs of which are slidably fitted into radial apertures 133a in the flyweights. Springs 133 will be seen to be formed of wire bent to substantially L-shape, with arms projecting substantially tangentially from the outer surface of each fly-weight to engage the interior of the bell 138 (Figures 2b, 8a and 8b). Upon rotation of the driven shaft fast enough to cause the centrifugal forces of fly-weights 131 to overcome the resistance of springs 133, 134, the inclined faces of the flyweights will be seen to react against the slidable bell 83 to urge the same to the left as viewed in the drawings.

Carried and movable by the bell 83 is a cam or eccentric 82 which is arranged to rotate in the path of any one of the offset portions 84—239—139—189 of a double armed lever 85, depending upon the axial position which the eccentric occupies, which is in turn determined by the governor. When the parts are in the position shown in the drawings, the eccentric, in the right hand position, is aligned with the portion 84 of lever 85. Accordingly at the first rotation of the driven shaft the eccentric immediately throws lever 85 to the left and to the position shown in Figure 9. The lever 85 is in turn connected, through its supporting shaft 86 and an arm 87 mounted on said shaft and carrying at its end a rounded portion 88, to a control valve 89, the function of which will presently be described. It will be seen, however, that this valve is movable to different positions by the eccentric 82, depending upon which of the offset portions of the lever 85 the governor-controlled eccentric is in alignment with. The operation of these parts will be taken up in describing the valving means which they control.

*Pumping and valving means for fluid-operable clutches*

Referring now to Figures 2b, 10 and 11; valve 89 is carried by and forms part of the pump and valve assembly generally designated 18, which is also mounted on the transmission shaft and comprises a body portion 90, a cover 91 secured over an eccentric pump chamber 98-99 therein, as by means of rivets 92, and a rotor 93 arranged within such eccentric pump chamber. The pump chamber is defined by a stator ring 96, and a rotor keyed to the driven shaft as at 94. Vanes 95 are radially slidable in the rotor, which is in slidable contact with the stator ring 96 at one point, while being smaller than the pump chamber defined by such ring. A suction chamber 98 is defined upon one side of the center line passing through such point of tangency, and a pressure chamber as 99 on the other side thereof. Chambered recesses 100—101 are formed in the pump body in substantial radial alignment with and connected to the suction and pressure chambers 98, 99 respectively. Centrifugal force is relied upon to initially move vanes 95 into contact with the stator ring, but after fluid pressure has been developed they are maintained in such contact by such pressure in a manner presently to be described. Fluid is drawn by this pump from the bottom of the liquid-filled casing through a strainer 105 arranged in the mouth of intake pipe 107. The strainer will be seen to be accessible through the drain plug 106 in the bottom of the casing.

The screen may be arranged to drop from the casing upon removal of the plug, thus automatically reminding the service man when draining the fluid medium in the casing that the screen should be cleaned, a necessary operation which might otherwise be overlooked.

The fluid is drawn through intake channel 108 and connecting port 109 into the recess chamber 100, and is carried therefrom through the pump chamber portions 98—99 and delivered to a recess chamber 101, whence it passes through outlet port 110, into relief valve chamber 111. A constant predetermined pressure is maintained by the spring pressed valve 112 contained within chamber 111 and normally covering the relief port 115, the tension of the spring 113 being such that the degree to which the port 115 is uncovered by excess pump delivery is variable to maintain constant the pressure of delivered fluid. The spaces 242 beneath the vanes are connected as by a channel 245, (Fig. 11) to the chamber 111, the vanes being thereby urged outwardly by the fluid pressure of the pump discharge. It will also be observed that the fluid pump is one adapted to supply fluid at a constant non-pulsating pressure and with complete quietness of operation. Noise from any elements of a motor vehicle drive is of course very objectionable, and with pumps of the gear type as well as of many other constructions, some noise is inherent to their operation. The manner in which the pump rotor vanes are urged outwardly by the fluid pressure will also be seen to eliminate the use of springs for such purpose and be far more dependable.

From chamber 111 the pressure fluid passes through passage 116 in a valve sleeve 117, past a valve 118 into a chamber 119 formed by a recessed portion of the valve 118, and thence through passage 120 in the pump body 90, and through passage 121 in the sleeve 122 of valve 89 into a recessed portion 123 of the valve. Valve chamber 123 communicates by means of an opening 124 with the hollow interior bore 125 of valve 89, through which the fluid passes, emerging through opening 126 and valve chamber 127 to port 128 whence it is exhausted through the slot 129 and relief port 130. It will be seen that when the valves 89—118 are in this position, the pressure fluid is not in communication with any clutching elements.

Upon attainment of a predetermined speed by the driven shaft, eccentric 82 is moved to the left, as viewed in Figure 2b, by the governor means previously described, until it is in axial alignment with the offset portion 139 of the stepped arm 85. The next rotation of the eccentric rocks the arm 85 to the right, thereby moving the valve 89 in the same direction, as viewed in the drawings (Figure 10), to the extent of one notch defined by detent pockets 142. This movement is of course imparted to desired degree by suitably proportioning the throw of the eccentric and the extent of projection of the toe 139 of the lever, the valve positions being yieldably maintained by a spring pressed detent as 141, which engages the pockets 142 in the slidable valve. The size of the inclined sides of these pockets and the locations of their centers are preferably such that a slight excess movement, beyond that induced by the eccentric, is imparted by the detent, thereby moving the lever arm slightly clear of the eccentric at each step and preventing further wear and contact between these parts.

*Fluid actuable clutches and their operation*

Upon movement of the valve 89 one notch to the right in the manner indicated, fluid after passing through the hollow interior 125 of the valve, as also previously described, is delivered by valve chamber 127 to port 140, with which port the valve chamber 127 is then aligned, relief port 128 now communicating with a chamber 191 of the valve 89. After passing through passage 140 the fluid flows through a chamber 144 of the valve 118, and thence to an annular chamber 146 which surrounds the transmission shaft 56 in registry with a radial passage 147 therein which communicates with a longitudinal conduit bore 148. Through bore 148 the fluid is conducted to another radial passage 149 opening at the surface of the shaft within the clutch assembly portion (Figure 2a). From passage 149 the fluid is conducted through annular chamber 150 and port 152 to a pressure chamber 153, defined by the web 155 on one side and a flexible diaphragm 154 on the other. The diaphragm is peripherally sealed to the web and at its central portion is slidably sealed to the hub 151 to close the chamber. Flow of fluid into the chamber 153 through other ports 156—157 is prevented by a ball check valve 158, which permits, however, quicker exhausting of the chamber than could take place through passage 152 alone, and consequently quick release of the clutch 5.

The fluid pressure is of course sufficient to expand the bellows or diaphragm with sufficient force to compress the clutch plates and lock the clutch 5, to establish the second speed drive in the manner previously described. The pressure chamber 153 is adequately sealed at the inner edge by snug engagement of a sealing portion 211 with the hub 151 on the one hand and similar engagement between the cupped flanges 185 and the sides of the enlarged portion 186 of the hub which supports the driving springs 184, as stated.

Simultaneously with delivery of fluid under pressure to chamber 153, fluid is delivered to an auxiliary applicator for the main clutch, presently to be described. The fluid passes from channel 148 in the shaft through radial bore 165 to an annular chamber 166 bounded on one side by a slidable two-way valve 167, which is by pressure in chamber 166 moved to the right as viewed in Figure 2a, to connect port 169 with that chamber and allow the fluid to flow into a chamber 172 of the fluid-actuable applying means for the main clutch, passing through channel 171.

As the driven machine gathers speed in second or intermediate torque drive the increased rate of rotation of the driven shaft causes the flyweights 131 in the governor 17 to move farther outward and by engagement with the steeper portions 136—137 of the bells 83—138 move the eccentric 132 farther to the left and into alignment with the toe 189 of arm 85. The rotation of the eccentric then immediately moves the arm and so valve 89 still farther to the right, to the third position, registering chamber 127 with a second port 190, through which the pressure fluid may in like fashion be delivered, after passing through communicating passages 192—193, to another annular chamber 194 also encircling the driven shaft within the pump body 90, and spaced and isolated from annular chamber 146.

At the same time the pressure chamber 153 of clutch 5 is connected to atmosphere to allow the exhausting of pressure fluid from and disengagement of that clutch, by movement of valve chamber 191 into registry with port 140 (which as described above communicates with pressure chamber 153), valve chamber 191 establishing connection between ports 140—128, and the latter venting to atmosphere through passages 129—130.

The pressure fluid delivered to chamber 194 passes through passages 195—196—197 in the transmission shaft 56, and through an annular collecting chamber 198 with which radial passage 197 communicates, to pressure chamber 200, through connecting passage 199. By expanding the bellows 201 and so compressing the plates of clutch 6, previously described, such clutch is engaged to couple the driven web 155 directly to the drum 4. Drum 4 being clutched to the driving shaft by the main clutch, direct drive is of course established through the cushioning springs 184 to the transmission shaft, and to the driven coupling 51, since in all forward speeds the sleeve 49 by which that coupling is carried is clutched by the teeth 52—53 to the transmission shaft.

It will be seen that expanding the diaphragm 173 provides the required pressure upon facings 67—68, to establish engagement of the main clutch irrespective of the rotational speed and of the centrifugal actuating means 3 at such time.

Upon the delivery of fluid under pressure to chamber 198, the slidable valve 167 encircling the forward end of driven shaft 56, is moved to the left as viewed in the drawings, to uncover the port 169 communicating through passage 171 with pressure chamber 172 defined by the forward face of the drum and the bellows 173. Pressure fluid is thus delivered to this chamber concurrently with its delivery to the direct drive clutch 6, and the resultant expansion of the diaphragm 173 applies the required pressure to the clutch plate 174 to fully engage the main clutch independently of the centrifugal actuating means 3.

The same will be seen to be true upon delivery of pressure fluid to second speed clutch pressure chamber 153 through the conduit bore 148, as above stated. At such time the delivery of pressure fluid to pressure chamber 172 through passage 165, valve chamber 166 and port 169 similarly engages the main clutch fully, irrespective of the centrifugal applying means. The valve element 167 thus serves to prevent communication between the two pressure channels 149 and 196 and maintain the isolation of these channels and then connected pressure chambers 153—200 respectively while yet admitting the pressure fluid from either to a common pressure chamber.

The release of the main clutch from fluid pressure engagement is aided by opposing pressure of a pronged or star shaped flat spring 270, and by the resiliency of the diaphragm itself. The pronged ends of spring 270 bear against and hold in position the friction facing plate 174. A retaining plate 271 is also arranged within the facing plate 174, and a stop ring 272 by means of which part of the engaging pressure of the diaphragm may be blocked off without losing any of its total flexibility. This will be seen to permit regulation of the fluid-effected engaging pressure in co-relation to the springs 71.

The chambers 150 and 198 formed in the hub 151 are isolated from each other by a reduced diameter within the hub, which is closely fitted as at 218 to the shaft 56. Seal points are further formed at the outer ends of the hub by closely fitted surfaces as at 219—220. Any liquid which may leak past sealing points 219 and 220 tends to fill drum 4, the excess being conducted back into casing 7 through spaces 279—280 of the gear sleeves, thereby flushing and lubricating the bearings thereof, and through space 281 and a slot (undesignated) in thrust washer 282. Sufficient liquid is allowed to flow into the drum in the manner indicated to keep the drum filled, so that any fluid pressure upon diaphragms 154—201 created by centrifugal force is virtually equalized on opposite sides of such diaphragms.

It will be understood that when the driven shaft again slows to a predetermined speed, the direct drive clutch is released and the intermediate clutch 5 engaged. This occurs with return of valve 89 to the second or middle position, which is effected by the throw of the eccentric flange 82 against a step 239 of the arm 85, which is axially aligned therewith when the governor member 83 is in the intermediate position. In such intermediate position the pressure chamber 200 of the direct drive clutch 6 will be seen to be open to the atmosphere by connection of the connecting port 190 to passage 217, opening to the air within the casing around the end of the operating stem portion of the valve 89, thus allowing the fluid to escape and this clutch to disengage.

Upon a still further reduction of the speed of rotation of the driven shaft, the eccentric flange 82 is returned by the governor to the right hand position shown in Figure 2b, aligning the same with the step 84 of arm 85 to throw the valve to the first or left position, as viewed in Figure 10, thereby also connecting pressure chamber 153 of clutch 5 to atmosphere through passages 140—217 and reconnecting the pump output to atmosphere, whereby only the low speed drive through drum 4, gears 8—9 and 12—13 remains effective.

*Over-control of fluid-operable clutches*

Personal over-control of the torque ratios by direct driver supervision of the several clutches is provided for, through means enabling changing the position of valve 118, which has previously been considered as occupying its normal or left hand position as viewed in Figure 10, in which position it offers no interference with operation of the parts in the manner previously described. This valve may be moved, however, to either of two other positions, in the first of which or middle position, (one step to the right) it provides direct connection between the ports 116—145, cutting off the flow through port 120 to valve 89. This connection is provided by valve chamber 119, which, when the valve 118 is moved one step to the right, bridges the ports 116—145. Such degree of movement of the valve is effected, in the shown embodiment, by means of a button 227, upon depression thereof to the extent indicated by the arrow 235 or until it abuts the larger of the two interfitted buttons (226). In vehicular installations this double button unit is preferably installed upon the floor boards of the vehicle in a convenient location for foot operation, as at the approximate position normally occupied by the clutch pedal, which is dispensed with when our construction is used. In stationary and other installations, the double button unit may of course be installed in any desired location and at any point, remote from or close to the transmission, and operated manually or otherwise. The central button 227 is held extended above the larger button 226, within which it is slidable, by a relatively light spring 230, while the larger button is projected by a considerably stiffer spring 229. Light pressure thus urges the valve 118 a predetermined distance (235) to the right (to the middle position), while heavier pressure is required to move the valve an additional distance (237) farther to the right, such movement being communicated to the valve by a Bowden wire conduit assembly 221—222, the wire directly connected at one end of the valve through an adjustable guide nipple 223 in the side of the casing 7, and at the other end connected to the smaller central button by means of a stem 341, which is guided by a sleeve 228. Adjustment of the nipple 223 which is threaded into the casing, permits endwise adjustment of the valve 118 to properly fix its initial positions, such movement also moving the entire unit and connecting conduit (or flexing the latter).

Upon movement of valve 118 the first unitary distance to the right, to the middle position, port 145, as previously stated, is directly connected to relief valve chamber 111, and assuming of course the gear assembly 13 to be in the forward position, pressure is delivered to the intermediate speed clutch 5 through the chamber 146, in the manner previously described. It will be seen, therefore, that as long as the button 235 is held in this position (under light pressure applied by the operator), the transmission will be held in intermediate torque drive. Passage 120 is at the same time open to atmosphere by virtue of the reduction of the left end of valve 118 to which the actuating wire is connected. Further, any passages with which the valve portion 127 may be in registration are thus now vented to atmosphere.

It will be seen that if valve 89 is already in intermediate position, valve 118 merely short circuits the same when moved one step to the right in this fashion, whereas if valve 89 is in the right hand position, that is, with the central bore 125 communicating through recess 127 with the direct drive clutch applicator chamber 200, such clutch (6) may be released by discharge through the valve and port 120. If on the other hand valve 89 is in the initial or left hand position, second speed will become effective as soon as sufficient pump pressure is developed to operate clutch 5 as the shaft 56 speeds up in first gear, after which roller clutch 16 will overrun.

Upon depression of both buttons 226—227 and consequent movement of the valve 118 still further to the right to a second predetermined position, the unreduced portion 236 of such valve passes the port 116, thereby allowing the pump pressure to discharge from chamber 111 directly to atmosphere, simultaneously connecting passage 145 and so the second speed clutch to atmosphere through port 140 and passage 217, thereby opening both clutches 5, 6 and main clutch fluid pressure chamber 172 as well as venting the pump pressure to atmosphere and causing disengagement of both clutches 5 and 6, so that the only drive which remains effective is the low gear ratio (high torque) drive through gear 13, which drive remains operable through said gear and the centrifugally actuated clutch.

In vehicular installations the springs 230—229 are preferably so proportioned that the mere weight of the operator's foot is sufficient to move the valve 118 to the intermediate position, while distinctly greater pressure, that is, a definite push, is required to throw it to the right hand position in which it establishes low speed drive.

It will be observed that the pump and control valve assembly 90 is floated upon and carried entirely by the driven shaft 56, although held from rotating therewith by an arm 246 extending laterally from the housing into engagement with a lug (undesignated) projecting from the side of the casing 7. The close fit of the chambered manifold portion encircling the shaft can thus be affected by no forces (such as deflection of the shaft) which might cause wear, other than the weight of the assembly itself.

When the gear and roller clutch assembly 13 is in the forward (left hand) position in which we have thus far assumed it to be, a relief port 37, which is connected to the fluid pressure supply source through a passage 249 establishing communication between such source and the valve chamber 123, is closed by means of a plug valve 36 which is maintained closed by shifter rail 31 while the latter is in the position it occupies when gear assembly 13 is in forward position. The rail is so grooved, however, as at 40, that when the gear assembly 13 is moved away from the forward position to either neutral or reverse, valve 36 is free to move under fluid pressure to open the escape port 37 and thus prevent the application of fluid pressure to either of the clutches 5, 6 when the manual control 22 has been moved to establish neutral or reverse drive condition.

*Suction torque control*

A further control element influencing the automatic shifting of valve 89 to determine the torque ratio under automatic control may be provided in the form of means responsive to the degree of suction in the intake manifold, where the transmission is used in conjunction with an internal combustion engine. Such torque control mechanism constitutes an adaptation of the Lassiter suction torque control as disclosed in his application Serial No. 756,903, filed December 10, 1934.

A suction chamber portion 251 of substantial size (Figure 3) is connected to the intake manifold as by means of the conduit 255. A regulatable valve screw 268 is provided in the suction line. The large chamber 251 constitutes a storage or delaying tank, while the piston 257 is slidable in a reduced upper cylinder portion 256, directly connected to the side of the casing 7 in the shown construction, as by means of the flange 252. The tendency of the suction developed in chamber 251 to draw down the piston 257 is yieldably resisted by a spring 258. The thrust of the spring is imparted through a stem 259 to an arm 260 carried by the projecting end of a shaft 261, which extends laterally through the casing 7 between governor and pump assemblies 17—18, as shown in Figs. 2b and 9, carrying yoke arms 262—263 pivotally connected with a collar 266 arranged to oppose movement of eccentric and governor bell assembly 82—83 to the left, an anti-friction thrust bearing as 267 being interposed. It will be seen that when the suction is insufficient to overcome the tension of spring 258, which condition naturally results from relatively wider throttle opening on increased engine loads, a portion of or the entire thrust of such spring resists movement of the eccentric to the left as viewed in Figure 2b, and thus delays the establishment of a reduced torque ratio drive, until relatively higher rotational speeds have been attained by the governor to overcome the various degrees of opposition of the spring 258. So also when the vacuum falls away sufficiently the resultant imposition of the force of spring 258 may be sufficient to overcome the centrifugal force of the flyweights and return them to a more central position.

*Modified shiftable gear and control arrangement*

The mechanically shiftable gear and overrunning clutch construction designated 13 in Figure 2b may be modified in order to provide the braking effect of a high torque gear ratio when desired. Such a modified construction is shown in Figure 16, with which the remaining apparatus may be used in the same or substantially the same form. In Figure 16 parts equivalent to those shown in the previous views have been given like reference characters distinguished by the addition of the letter *a*. As shown in that view, the transmission shaft 56a may be similarly piloted in the driven sleeve 49a, which sleeve is splined as at 49b, such splined portion slidably supporting an interfitted hub 45a with which are slidable an overrunning clutch assembly 16a and a ring gear 13a constituting the driving element of the overrunning clutch. The entire unit is similarly slidable by a shifter fork as 32a. The gear 13a is slidable from its shown neutral position into engagement with either low speed countershaft gear 12a, or the reverse idler 15a meshing with countershaft reverse gear 14a.

Carried by the hub portion 45a of the slidable unit are clutch teeth 52a engageable with clutch teeth 53a mounted on the collar 54a of the centrifugal governor unit 17a. A separate web 330 is rigidly connected to the ring gear member 13a at its end opposite clutch teeth 52a, and is at its inner extremity splined similarly to hub portion 45a for cooperation with either of the spaced splined portions 49a—248a carried by the driven sleeve 49a, to lock the gear to the sleeve and enable the transmission of reversible drive through such gear. The web 330 is shown as somewhat spaced from hub 45a and secured in the end of the gear by the interfitting of splined portions, as at 331, and by peening over the gear member outside the web as at 327.

The clutch teeth 52a will be seen to be so spaced from the body of hub 45a, and so carried by an overhanging supporting portion 328, that the unit after pass'ng through the position in which teeth 52a—53a are engaged (while the splined hub of web 330 remains free of splines 49b) may be moved still farther in the same direction (to the left in the drawing) to free teeth 53a and allow the latter to turn freely within the space 329. The parts will also be seen to be so proportioned that when the unit is in this last-described position web 330 is also engaged with splines 49b, while gear 12a is wide enough to provide for full meshing of gear 13a therewith in either of the last two positions. When teeth 52a—53a are engaged and web 325 is free of splined portion 49b, drive may be transmitted to the driven sleeve either from low speed gear 12a through overrunning clutch 16a and hub 45a to the driven sleeve 49a, or the sleeve may be driven directly from transmission shaft 56a through splined connection 55a to hub 54a and through clutch teeth 53a—52a to hub 45a. The drives through clutch teeth 52a—53a are of course at higher speed than the drive through gear 12a, and cause overrunning clutch 16a to release, allowing hub 45a to overrun the gear 13a.

When the gear and overrunning clutch unit 13a—16a is moved all the way to the left and teeth 52a—53a freed as above described, engagement of the gears 12a—13a being maintained and the web 330 being then directly keyed to the driven sleeve portion 49b, reversible high torque (low speed) drive may be imparted to the driven sleeve through gear 12a. A reversible drive is thus provided which prevents free coasting of the vehicle and imposes the braking effect of the engine so long as the main clutch is engaged, while the lower torque (higher speed) drives are ineffective by reason of the disengagement of clutches 52a—53a. It should be observed, however, that under such conditions the transmission shaft and pumping mechanism will continue to be driven by reason of the viscosity drag of the wet clutches, which drag is always sufficient to turn the freely rotatable shaft 56a when disengaged from the driven sleeve. Thus even were the engine stopped or slowed to such extent as to release the centrifugal clutch operating means, with the clutch portions 52a—53a disengaged in this manner, the auxiliary applicator would maintain engagement of the main clutch as long as, or establish such engagement as soon as, the shaft 56 reached sufficient speed to cause the pumping mechanism to supply pressure to the auxiliary applicator.

When the slidable unit is moved to the rearmost position to key the web 330 to splined portion 248a of the driven sleeve, reverse drive is established directly through the web from driven gear 13a, which is then meshed with reverse idler 15a, while all forward drives are disengaged. The transmission shaft of course continues to turn in the forward direction, as in the previous embodiment, under either viscosity drag or the action of the wet clutches, (depending upon the speed of the shaft 56) pump priming being thus maintained.

Whichever embodiment of slidable gear and overrunning clutch unit is used, the plate 162 of the intermediate clutch unit 5 may or may not be arranged on the cage of the overrunning clutch or its hub, because the braking effect of lower gears on hills, etc., has been found to be unnecessary with present day motor vehicles. The two directional drive arrangements provided in each case in the present disclosure are to meet the public demand for such condition due to the belief in its necessity. If the overrunning clutch cage in the intermediate drive be relieved of this connection, regardless of whether the first embodiment or that of Figure 16 is used, the intermediate clutch 5 may remain engaged while direct drive clutch 6 is also engaged. Under these conditions the unreduced portion 290 of the valve 89 may be omitted and the exhaust passages 128—129—130 eliminated or closed. After such change it will be seen that the pressure fluid will continue to be delivered to the intermediate clutch while also being delivered to the direct drive clutch 6. An advantage of this method of operation would be the elimination of slipping action upon transfer of drive from one clutch to the other. With such change it will also be seen that no communication need be provided between fluid channel 196 and the main clutch fluid actuating chamber 172. Element 167 would then preferably be fixed in longitudinal position rather than slidable on the shaft 56, to prevent cross communication between chambers 166—198 while remaining in the position in which it is shown in Figure 2a to allow constant energization of the main clutch fluid controlled actuator from the second speed fluid channel 148 during those periods when either the clutch 5 or both clutches 5 and 6 are engaged.

*Miscellaneous features*

In order to remove the clutch facing 68 to replace the same, it is only necessary to lift the fingers of the spring 270 and slide the facing plate 174 from beneath this spring. The opposite facing 67 is also easily removable by removing the retaining wire or pin 283 which locks the facing plate 285 upon its supporting studs 284.

The sub-pressure plates 160—203 will be seen to have frusto-conical inner faces on their sides which cooperate with the pressure plates 159—202 respectively. This compensates for distortion of the main pressure plates, by allowing them to bow outwardly towards the center while yet maintaining the application of pressure at the mean diameter of the interspaced clutch plates, which is essential for proper operation and wear. This feature materially reduces the cost of construction, since otherwise the main pressure plates would have to be at least three or four times thicker to adequately resist the bowing tendency. The flexible pressure plates also serve as anti-chatter springs, being preferably formed of suitable spring-material and cushioning the clutch-applying pressure, as will be apparent, by their flexure in the manner described.

The ports or passages 152 and 199 through which pressure fluid is fed to the clutches 5—6 are restricted, and so proportioned in relation to the type and operating viscosities of the fluid employed that a predetermined time interval, ordinarily approximately three seconds, is required for the fluid to pass through ports 152—199 and fill the pressure chambers 153—200 to fully engage the clutches 5 and 6. This provision is made for the reason that in the normal operation of a motor vehicle by most drivers, the length of time in which each of the lower speed ratios is maintained during shifting is practically uniform, whether the vehicle is accelerated rapidly or slowly, the only difference being in the degree of throttle opening. In other words, while the time interval is approximately the same in first or second speed, the driver, if in a hurry, ordinarily speeds up the engine faster, but does not leave either first or second speed drives engagement for any longer period of time. The introduction of the time factor by the restriction of the feeding ports 152, 199 therefore allows the driver a similar choice in driving a vehicle equipped with our automatic transmission. He may accelerate, for example, on one occasion to 5 or 10 miles an hour in low speed drive within the three second period, while on another occasion he may accelerate to perhaps 25 miles per hour, by merely speeding up the engine more rapidly. The provision of such a time interval alone however would not be sufficient for automatic control, since at vehicle speeds below a certain range it is essential for efficient operation that low or intermediate speed drive be maintained for the entire period during which the vehicle is traveling below such speed range. For this reason the speed sensitive control is provided in the form of centrifugal governor 17.

Provision of restricted feed ports proportioned to provide a predetermined time interval for clutch engagement when the fluid is at normal temperature introduces another important advantage, since as a practical matter it is necessary to use a fluid whose viscosity varies under temperature changes. Therefore, when warming up or first starting the engine in cold weather, or low temperature conditions, the liquid being of greater viscosity requires a longer time to pass through the ports 152—199 and apply in the clutches, accordingly allowing for running in the lower gears for a somewhat longer period before direct drive is established, thus easing the load upon and assisting in the warming up of the engine. The areas of the ports are such, however, as to pass the fluid within the desired interval after it has warmed up sufficiently to attain its normal working viscosity. The restricted ports 152—199 perform the further function of preventing sudden or jerky application of the clutches.

Additional delay in initial engagement is also provided by the spring means 61, 62 which prevent the flyweights 60 of the centrifugal clutch applying means from moving outwardly until the driving member attains a predetermined speed. This speed is high enough to allow idling the engine at a rate sufficient to permit warming up the engine at a reasonable speed without engaging the clutch. This is of course particularly important in a motor vehicle, and the rate may be somewhat higher in winter weather. Further, since the torque capacity of an internal combustion engine is inherently low at low speed, it is desirable that it be brought up to a speed approaching maximum torque efficiency before the clutch begins to take hold. The difference between the speed at which clutch engagement begins and that at which it transmits full torque should, moreover, not be great.

The use of separate springs 134—188 resisting axial movement of the governor bell 83 and its separate angles enables independent adjustment of the rotative speeds at which valve 89 is shifted to each of its positions by the governor. The bell 83, which resists outward movement of the flyweights and is moved thereby, is provided with two angularly disposed faces, as above stated. The first, 135, is more gradual than the outermost steeper portion 136. Outward movement of the flyweights 131 along the more gradual portion is resisted by springs 133 and 134, while the parts are so proportioned that when the flyweights reach the steeper portion 136, spring 134 is fully compressed and the additional resistance of spring 188 opposes further outward movement of the flyweights along the steeper portion 136, and the resultant valve movement to the third or direct drive position. It will thus be seen that by changing (relatively) the angled portion and/or the tension of springs 133—134—188, the speed or relations of speeds at which shifting to intermediate or direct drive is effected by the governor may be regulated within wide limits.

The form of governor shown, comprising a symmetrical housing enclosing sliding weights, not only provides much greater compactness than a construction employing swinging or pivoted flyweights, but eliminates projections which would otherwise agitate the liquid and cause heat and frictional losses, and further prevents the interference with normal governor operation which would be caused by the liquid.

The operating means 19 for the valve 18 also enables complete disengagement of the driven elements from the driving elements, equivalent to declutching the drive of a motor car having manually operated clutch and transmission portions arranged in the manner now regarded as conventional. Disengagement is effected by moving the valve 118 to its low speed position in which the fluid pressure is removed from all clutches and particularly the pressure chamber 172 of the fluid pressure applicator for the main clutch. When such condition obtains the driving shaft 1 can be sufficiently reduced in speed to release the main clutch from its centrifugal pressure engagement or if desired can be entirely stopped whether or not the driven members continue to rotate. This is due to the fact that low gear 13 cannot be driven in a forward direction by the driven shaft, due to the presence of the overrunning clutch 16, and likewise that the shaft 56, although connected to the driven sleeve 49 cannot drive the clutch drum 4 because of the disengagement of both clutches 5 and 6. Under these conditions therefore no back drive from the driven members can keep the main clutch at centrifugal engagement speed, thereby permitting release of the latter and total disconnection and overrunning of the driven drum 4. This constitutes a means to allow "coasting" of a vehicle when desired with but slight manual effort.

As is well known, when plate or disc clutches are operated immersed in a fluid such as oil of sufficiently high viscosity to act as an efficient lubricant, there is strong tendency of the plates to adhere when the clutch is disengaged, even though the plates are reasonably widely separated. This effect becomes particularly pronounced with the operation of the device outdoors in winter, when the oil or other liquid medium between the plates may become practically non-fluid. The viscosity drag so caused also increases in proportion to the mean radius of the plate engaging surfaces, and since it is highly desirable in the interests of smooth operation, long life and efficiency that this radius be as great as possible, consideration of viscosity drag becomes of importance. With a transmission of the disclosed construction such viscosity drag is of little or no importance when the vehicle is started with the gear unit 13 in the forward position, but with such gear unit in neutral or reverse position the effect of such viscosity drag would be very undesirable if it could affect the driven coupling 51, because clutch units 5 and 6 would strongly urge rotation of the driven shaft 56 in the forward direction. It will be seen however that the driven coupling and sleeve 49 are disengaged from shaft 56 by movement of the gear unit 13 away from forward driving position, by reason of the separation of teeth 52—53, so that such viscosity drag can have no effect on the driven elements. In reverse the sleeve 49 is revolved in the opposite direction, and if it were at this time coupled to shaft 56, the latter would be very strongly urged against reverse by the viscosity drag of both clutch units 5 and 6, particularly because the clutch driven plates would add their reverse velocity to the forward velocity of the driving plates. By virtue of the disconnection of sleeve 49 from shaft 56 however, the entire clutch assembly with the exception of the single plate 162, whose drag is negligible, is allowed to rotate freely as a unit in the forward direction.

Uncoupling driven sleeve 49 from shaft 56 also enables the pump to function with the mechanism in neutral or reverse. With the shaft 56 so disconnected, advantage is taken of the viscosity drag of the clutches to cause the pump to continue running in the forward direction, not only maintaining the priming of the pump but also allowing the liquid to be warmed up by running in neutral or reverse, thus passing the liquid through the pump as many times as desired. It will be seen on the other hand that if the shaft 56 and so the rotor 93 of the pump could be run in reverse by solid connection of shaft 56 with sleeve 49, the liquid would be ejected from the pump intake and an objectionable length of time would be necessary to again prime it upon being started in the forward direction, which effect would be particularly pronounced in cold weather operation.

Since rotation of the shaft 56 also causes the governor member 83 to perform its normal operations, the valve 89 further being moved to its clutch engaging positions upon such rotation of shaft 56, if the engagement of the friction clutches 5—6 were allowed to take place with the mechanism in reverse or neutral, the lowest or idling speed of the driving member might be too high to permit return of the governor member 83 to the first position, which would thereby preclude forward engagement of the shaft 56 with the then stationary member 49. Provision of relief port 37, which is opened by movement of the gear assembly 13 to neutral or reverse prevents such operation of the friction clutches 5—6, while allowing the pump to continue functioning in the forward direction for the reasons stated.

It will also be seen that by housing the wet clutches in a separate drum rotating in air, dissipation of the heat generated by repeated clutch engagement under load is greatly aided.

It will be perceived that the suction torque control unit 21 may be eliminated without affecting the operation of the device in any way other than leaving such function as it performs automatically to manual control by the operator, since the control unit 19 provides means for effecting such variation or for any other contingency and the exercise of the operator's judgment.

Clutch assembly modification

A somewhat modified clutch assembly is shown in Figure 15, in which the main clutch 3a and its combination engaging means are housed alone within the flywheel portion 2a. The friction facings 67a and 68a are contained within the flywheel portion and do not encompass the drum 4a as in the embodiment previously described. The fluid operated wet clutches 5a and 6a will be seen to be substantially the same in construction and operation as the equivalent clutches described in the previously disclosed embodiments and analogous parts will be seen to be designated by similar reference numerals distinguished by the addition of the letter *a*. The fluid pressure applicator for the main clutch, however, is fed from the longitudinal bores 148a—196a through passages 165a—197a separated by an analogous slidable valve element 167a, which enables delivery of fluid to pressure chamber 172a from either of said passages through a port 169a, while preventing cross communication between the passages 148a—197a. Through the port 169a fluid flows to the chamber 170a and thence through passages 300, chamber 301 and passages 302—303 to the pressure chamber 172a, formed by a pair of diaphragms 305—306 forming an envelope which when expanded bears against web plates 307—308 to force clutch facings 67a—68a into full driving engagement with pressure plate 66a and the inner face of member 2a, respectively, thus locking the main clutch in like manner. Diaphragms 305—306 ar sealed together, as at 309, and at their inner diameters similarly sealed, as by seam welding to a flange 310 of hub 311. The hub 311 is secured to drum 4a as by the bolts 312, pressure chamber 301 in the hub being sealed as at 313 and 314 by closely fitting the same to an inner hub 315 mounted on the end of shaft 56a, as upon bushing 73a.

Any fluid from the high pressure chamber 301 which may pass the seal point 314 is conducted back to the pressureless space of the drum 4a through a drain passage 316 communicating with an annular space 317 (also pressureless) at the drum end of the sealed space 314. External leakage from the chamber 317 is precluded by a gasket as 318 or other suitable means.

The web plates 307—308 are preferably constructed of spring material, so tensioned as to yieldably resist expansion of the diaphragms 305—306 and aid release of the clutch when the pressure is relieved from the chamber 172a between the diaphragms. Plates 307—308 are also preferably formed with integral spring tongues at their peripheries, as 319, to cushion the main clutch against chatter, as is common practice.

It will be observed that the fluid operable auxiliary applying means 173 for the main clutch also enables turning the driving element 1 from the driven element when desired. It is thus possible to start the engine by towing or pushing a vehicle in the normal manner, or by any means rotating shaft 56, so long as assembly 13a is in forward drive position, as connection is established by the fluid pressure applicator as soon as the speed of the normally driven elements is reached or passed at which intermediate or direct dive is inaugurated. Further, the auxiliary applying means maintains main clutch engagement at much lower speeds than are necessary to keep the centrifugal actuator effective. Thus in vehicular installations, when, as is often the case, it is desired to drive slowly in a higher speed gear, this may be done without unduly racing the engine.

It will likewise be observed that when the unit 13 (or 13a) is shifted to neutral position the vehicle may be towed without turning over the engine, also in the normal manner.

It will be observed that in event of any tendency for the mechanism to start in direct or intermediate rather than low speed drive, due to viscosity drag in the wet clutches, in such degree, especially, as it is present in cold weather, the centrifugal clutch provides a compensating effect, since it is capable of smoothly bringing the mechanism up to speed, though not at increased torque ratio, and over a greater period of time.

It will be observed that valve 167 is guarded against wear by floating the sleeve 168, in such manner that it may move radially, between ring 325 and hub 216, by which members it is retained. This precludes the valve 167 and also the seal surfaces 220 from at any time acting as a journal on the end of the shaft 56 for the clutch drum 4, the load always being received by the bushing 73, regardless of the wear of the same.

The complete multiple clutch assembly best shown in Fig. 2a is adapted to be disconnected from the ratio-changing and control assembly contained in casing 7 without disturbing any elements of either assembly. It will be seen that this may be accomplished merely by withdrawing one from the other; the splined end 176 of the sleeve 175 passing freely through the hub 74; the splined portion 187 of shaft 56 passing freely through the hub 177; and the reduced end portion of the shaft 56 slipping through its surrounding fittings without interference.

The casing 7 is provided with bolt holes 291 in flanges 292 for fastening the same to any suitable supporting member such as a frame which may surround the multiple clutch assembly. The only requirement in the setting-up of the complete mechanism is that the axial relation between the driving shaft 1 and the casing 7 be maintained within reasonable limits.

If desired the ratio-changing in this invention may be controlled in an interrupted manner such as is provided for in the previously filed application of Robert B. Aspinwall, Serial No. 706,232, filed January 11, 1934. In other words, connection may be made so that some elements under the control of the operator, such as the accelerator pedal of a motor vehicle, would have to be released to allow changes in ratio. This may be accomplished by means of an escapement mechanism or equivalent, such as the modification illustrated in Figures 17 and 18. As shown in Figure 17, stepped ratchet teeth 401, 402, having inclined back surfaces are formed upon the end of valve 89. The teeth are engageable by a pair of pawl-like escapement arms 403, 404, individually swingable upon a supporting shaft 405 and one slightly longer than the other. The shaft also carries an actuating portion 407 for the escapement arms, projecting between the arms and fast upon the shaft, while the arms, which are loose upon the shaft, are drawn toward each other and against the actuating portion by a spring 408. A bellcrank, the arms of which are designated 406, 411, is fixed to the shaft 405. A spring 409 secured to arm 406 urges it against a stop 410, thereby yieldably holding the escapement arms in centered position. When so centered the escapement arms are spaced insufficiently to allow the extension portions 401, 402 of the valve to pass between them. To the other arm 411 of the bell crank is attached a link 412, connected at its other end to a foot pedal 413, which may be the throttle or accelerator pedal for the engine, although it is of course obvious that a separate pedal might be used if desired.

In such modified construction, resilient spring means 412 is interposed between the governor actuated shaft 86 and the valve 89, in such manner that although the valve may be moved positively by the shaft, through finger 415, in the direction in which movement is unopposed by the ratchet arms, the shaft may rock independently in the opposite direction, merely flexing the spring, when the valve is restrained by the escapement mechanism. As soon as such restraint is relieved, however, the valve is moved to a position corresponding to that of the shaft, under the influence of the energy stored in the spring.

Assuming the car to be under way, and its speed increasing so that action of the governor means previously described tends to move the main valve 89 to the right, to increase the gear ratio, the action of the apparatus incorporating the escapement mechanism is as follows:

When the pedal 413 is depressed, which will be considered as acting to open the engine throttle, arm 403 is withdrawn from abutment 401, behind which it normally lies when the valve is in the left hand (first speed) position, but at the same time arm 404 catches this abutment, being slightly longer than arm 403. When the speed of the vehicle has increased sufficiently to cause the governor to rock the shaft 86 to a position corresponding to second gear operation, movement of such shaft occurs in the normal manner, but valve 89 is held against movement and retained in the first speed position by arm 404. When, with the vehicle travelling at sufficient speed, the operator desires to change to the intermediate gear, he merely releases the pedal 413. Arm 404 immediately releases abutment 401, while arm 403 engages abutment 402 as the main valve moves over to its intermediate speed position. When the pedal 413 is again depressed, to accelerate the vehicle in second gear, arm 404 catches abutment 402 as arm 403 releases it, and holds the valve in the intermediate position as long as the accelerator pedal is depressed. As the speed of the vehicle continues to mount, and when it passes a predetermined point, as previously stated, the governor controlled shaft 86 is rocked still farther to the right, but again the valve is restrained by the escapement mechanism, which maintains its engagement with shoulder 402. When the operator now again releases the pedal, the valve is released and moves to the high speed position in which it is shown in Figure 17, under the influence of the spring 412. Direct drive is thus established in the manner already described, and is maintained until the speed drops to the predetermined point, whereupon reverse operation of the mechanism takes place. It will be seen, however, that upon deceleration the escapement mechanism cannot delay shifting back to the lower gear ratios, as the escapement is not effective in this direction; both the backs of the hooks 403, 404, and the abutments on the valve being inclined to permit the hooks to ride freely over the latter.

While it will be apparent that the illustrated embodiments of our invention herein disclosed are well calculated to adequately fulfill the objects and advantages primarily stated, it is to be understood that the invention is susceptible to variation, modification and change within the spirit and scope of the subjoined claims.

What we claim is:

1. In combination with driving and drivable torque transmitting elements, power transmission means including a clutch, operating means for the clutch responsive to speed change of the driving element, for coupling one element to the other upon attainment of a predetermined speed by the former, additional transmission means including a fluid pressure operable clutch for connecting said elements at a different ratio, said clutches being engageable in overlapping relation whereby the transmission of torque between said elements may be uninterrupted, and means responsive to speed variation of the driven shaft for controllingly actuating said fluid-pressure operable clutch.

2. In combination with driving and drivable torque transmitting elements, power transmission means including a clutch, operating means for the clutch responsive to speed change of the driving element for coupling one element to the other upon attainment of a predetermined speed by the former, additional transmission means including a plurality of fluid pressure operable clutches for connecting said elements at a different ratio, said fluid operable clutches being engageable in overlapping relation, and one thereof being engageable in overlapping relation with respect to the first mentioned clutch, whereby the transmission of torque between said elements may be uninterrupted, and means responsive to speed variation of the driven shaft for controllingly operating said fluid-pressure operable clutches.

3. In combination with driving and drivable elements and a source of fluid under pressure, means for transmitting rotation from the former element to the latter, including transmission elements potentially providing driving connections therebetween at different speed ratios, a plurality of clutching means for rendering said transmission elements operative and inoperative, fluid-operable means for actuating certain of said clutching means, mechanical actuating means for actuating at least one of said clutching means for a lower speed drive, said lower speed drive including a gear train in series with said mechanically actuable clutching means, and means for freeing and engaging one of the gears of said train at will to make and break the lower speed drive through said mechanically actuable clutching means and gear train.

4. In combination with driving and drivable elements and a source of fluid under pressure, means for transmitting rotation from the former element to the latter, including transmission elements potentially providing driving connections therebetween at different speed ratios, a plurality of clutching means for rendering said transmission elements operative and inoperative, including fluid-operable means for actuating said clutching means, independent actuating means for at least one of said clutching means, a gear train in series with said independently operable clutching means and with said driving and drivable elements, and personally operable shift means for freeing and engaging one of the gears of said train.

5. In an automatic transmission, in combination with a casing, rotatable driving and driven elements appurtenant the casing, a shaft rotatable in the casing, torque converting means within the casing including fluid-operable means mounted on said shaft for selectively connecting and disconnecting said elements and torque converting means, said shaft having a fluid conducting channel therein connected to said fluid-operable means, including a manifold portion floated on and laterally movable with any side play of the shaft but non-rotatable therewith and connected to the channel therein, and pumping and valvular means for controllingly actuating said fluid-operable means also carried by said manifold portion.

6. In an automatic transmission, in combination with rotatable driving and driven elements and a casing and including a shaft rotatable in the casing, torque converting means also within the casing, fluid-operable means for controlling the effectiveness of said torque converting means and connecting and disconnecting said elements, said fluid-operable means being mounted on said shaft and said shaft having a fluid-conducting channel therein connected to said fluid-operable means, a manifold portion floated on and laterally movable with any side play of the shaft but non-rotatable therewith and in fluid-conductive connection with the channel therein, fluid-regulating means for controlling the operation of said fluid-operable means also mounted on said shaft and responsive to changes of rotational speed thereof and connected to said fluid-regulating means for governing the actuation thereof.

7. In an automatic transmission, in combination with a casing, rotatable driving and driven elements appurtenant the casing, a shaft rotatable in the casing, torque converting means within the casing including fluid-operable means mounted on said shaft, said shaft having a fluid-conducting channel therein connected to said fluid operable means, and means for delivering fluid under pressure to said fluid-operable means, including a manifold portion floated on and bodily movable laterally with the shaft but non-rotatable therewith.

8. In an automatic transmission, in combination with a casing, rotatable driving and driven elements appurtenant the casing, a shaft rotatable in the casing, torque converting means within the casing including fluid-operable means for selectively connecting and disconnecting said elements and torque converting means, said shaft having a fluid conducting channel therein connected to said fluid-operable means, a manifold portion floated on but non-rotatable with the shaft and connected to the channel therein, said manifold portion being laterally movable with the shaft, and pumping means also carried by said manifold portion.

9. In an automatic transmission, in combination with substantially aligned driving and driven shafts, separate means for connecting said shafts in different relative driving ratios, including a countershaft, a gear train carried partly by said countershaft and potentially connecting said driving and driven shafts, friction clutch means for rendering said gear train effective and ineffective, additional means including another friction clutch for directly connecting the driving and driven shafts, said clutches being positioned appurtenant one another, and encircling the common axis of said shafts, fluid operable means for actuating said clutches, means responsive to the rate of rotation of the driven shaft for controlling the application of said fluid operable means, additional friction clutch means arranged in series with at least one of said two first mentioned clutches whereby to render the same ineffective when said additional clutch means is disengaged, and means responsive to the speed of the driving shaft for operating said last mentioned clutch.

10. In a torque converting and transmitting device, in combination with driving and drivable elements and a plurality of engageable and disengageable members providing potential driving connections therebetween at different ratios, a plurality of clutching means for rendering such connections effective and ineffective, fluid-operable means for actuating certain of said clutching means, mechanical operating means for at least one of said clutching means responsive to the speed of one of said elements, and mechanical controlling means for said fluid-operable means responsive to the speed of the other of said elements.

11. In a torque converting and transmitting device, in combination with driving and drivable elements, a source of fluid supply and means for creating fluid pressure, a plurality of coupling means for providing driving connections between said elements at different ratios, means operable by such fluid pressure for actuating at least one of said coupling means, and automatic centrifugally operable means for actuating another of said coupling means.

12. In combination with driving and driven elements, means for transmitting rotation from one to the other at different selectable ratios including torque converting elements for providing one or more of such ratios, a source of fluid supply under pressure, a plurality of coupling means for connecting and disconnecting said elements and torque converting elements, a fluid-pressure operable means for actuating at least one of said coupling means, independent-speed-responsive automatic operating means for another of said coupling means, and personally operable means for making and breaking the driving connection of said last-mentioned coupling means.

13. In combination with driving and driven elements, means for transmitting rotation from one to the other at different selectable ratios including torque converting means for providing one or more of such ratios, a source of fluid supply under pressure, a plurality of coupling means for connecting and disconnecting said elements and torque converting means, automatic fluid operating means for at least one of said coupling means, and additional independent automatic operating means for another of said coupling means.

14. Automatic transmission means as set forth in claim 13 in which said fluid operating means is responsive to the speed of one of said elements, and said independent automatic operating means is responsive to the speed of the other of said elements.

15. Automatic transmission means as set forth in claim 13 including governor means for said fluid operating means responsive to the speed of the driven element, and means responsive to the speed of the driving element for controlling said independent operating means.

16. Automatic transmission means as set forth in claim 13 including governor means for said fluid operating means responsive to the speed of the driven element, and in which said independent operating means includes a centrifugal clutch.

17. In a torque converting and transmitting device, in combination with driving and drivable elements, means including a plurality of clutches for establishing and interrupting driving connections between said elements at different ratios, a plurality of fluid-operable actuating means for said clutches, control means movable to progressively energize said fluid-operable means, governor means automatically responsive to the rate of rotation of one of said elements for moving said control means, and additional clutch actuating means automatically responsive to the rate of rotation of the other of said elements.

18. In an automatic transmission, in combination with substantially aligned driving and driven shafts, separate means for connecting said shafts in different relative driving ratios, including a countershaft, a gear train carried partly by said countershaft and potentially connecting said driving and driven shafts, a friction clutch for rendering said gear train effective and ineffective, additional means including another friction clutch for directly connecting the driving and driven shafts, means responsive to the rate of rotation of the driven shaft for operating said clutches, additional clutch means having a portion arranged in series with both said first mentioned clutches, whereby when disengaged to render both of said first two mentioned clutches ineffective, additional torque converting means potentially connecting the driving and driven shafts independently of said two first mentioned clutches but arranged in series with said last mentioned clutch, all of said clutches being arranged appurtenant each other and the two first mentioned having one element common to both and rotatable as a unit, said last mentioned clutch having a portion directly connectible by engagement thereof with an element of one of the first mentioned clutches.

19. In an automatic transmission, in combination with substantially aligned driving and driven shafts, separate means for connecting said shafts in different relative driving ratios, including a countershaft, a gear train carried partly by said countershaft and potentially connecting said driving and driven shafts, a friction clutch for rendering said gear train effective and ineffective, additional means including another friction clutch for directly connecting the driving and driven shafts, means responsive to the rate of rotation of the driven shaft for operating said clutches, additional clutch means having a portion arranged in series with both said first mentioned clutches, whereby when disengaged to render both of said first two mentioned clutches ineffective, additional torque converting means potentially connecting the driving and driven shafts independently of said two first mentioned clutches but in series with said last mentioned clutch, and personally operable means for disconnecting said additional torque converting means.

20. In an automatic transmission, in combination with substantially aligned driving and driven shafts, separate means for connecting said shafts in different relative driving ratios, including a countershaft, a gear train carried partly by said countershaft and potentially connecting said driving and driven shafts, a friction clutch for rendering said gear train effective and ineffective, additional means including another friction clutch for directly connecting the driving and driven shafts, means responsive to the rate of rotation of the driven shaft for operating said clutches, additional clutch means having a portion arranged in series with at least one of said first mentioned clutches, and additional torque converting connecting means independent of said two first mentioned clutches and also arranged in series with a portion of said last mentioned clutch.

21. In an automatic transmission, in combination with substantially aligned driving and driven shafts, separate means for connecting said shafts in different relative driving ratios, including a countershaft, a gear train carried partly by said countershaft and potentially connecting said driving and driven shafts, a friction clutch for rendering said gear train effective and ineffective, additional means including another friction clutch for directly connecting the driving and driven shafts, said clutches being mounted in juxtaposition and concentric with the axis of said shafts, means responsive to the rate of rotation of the driven shaft for operating said clutches, additional clutch means arranged in series with both previously mentioned clutches whereby when disengaged to render said two first mentioned clutches ineffective, and means responsive to the speed of the driving shaft for operating said last mentioned clutch.

22. In an automatic transmission, in combination with substantially aligned driving and driven shafts, separate means for connecting said shafts in different relative driving ratios, including a countershaft, torque converting gearing carried partly by said countershaft and arranged in a train providing potential driving connection between said driving and driven shafts, clutch means for controlling the effectiveness of said gear train, means responsive to the speed of the driven shaft for operating said clutch means, additional means including another clutch potentially providing in parallel to said gear train another driving connection of different ratio from that of said gear train, means also responsive to the speed of the driven shaft for controllingly operating said last mentioned clutch, additional clutch means arranged in series with both of said previously mentioned clutches whereby when disengaged it renders both such clutches ineffective, means responsive to the speed of the driving shaft for operating said last mentioned clutch, and personally operable means forming part of and arranged to make and break another driving connection through said last mentioned clutch but independent of said two first mentioned clutches.

23. In an automatic transmission, in combination with substantially aligned driving and driven shafts, separate means for connecting said shafts in different relative driving ratios, including a countershaft, constantly meshed torque-converting gearing carried partly by said countershaft and arranged in a train providing potential driving connection between said driving and driven shafts, pick-up clutch means for controlling the effectiveness of said gear train, pressure fluid means responsive to the rate of rotation of the driven shaft for operating said clutch means, additional means including another clutch potentially providing in parallel to said gear train another driving connection of different ratio from that of said gear train, automatic pressure fluid operating means also responsive to the speed of the driven shaft for operating said last mentioned clutch, additional clutch means arranged in series with both clutch means previously mentioned, whereby when disengaged to render both of said first mentioned clutch means ineffective to complete a driving connection between the driving and driven shafts, and automatic mechanical operating means for said last mentioned clutch responsive to the speed of the driving shaft.

24. In an automatic transmission, in combination with substantially aligned driving and driven shafts, separate means for connecting said shafts in different relative driving ratios, including a countershaft, constantly meshed torque-converting gearing carried partly by said countershaft and arranged in a train providing potential driving connection between said driving and driven shafts, pick-up clutch means for controlling the effectiveness of said gear train, means responsive to the speed of one of said shafts for engaging said clutch means, additional means including another clutch potentially providing in parallel to said gear train another driving connection of different ratio from that of said gear train, means responsive to the speed of the other shaft for operating said last mentioned clutch, and means also responsive to the speed of said other shaft for locking said first mentioned clutch means in engagement.

25. In an automatic transmission, in combination with substantially aligned driving and driven shafts, separate means for connecting said shafts in different relative driving ratios, including a countershaft, constantly meshed torque-converting gearing carried partly by said countershaft and arranged in a train providing potential driving connection between said driving and driven shafts, pick-up clutch means for controlling the effectiveness of said gear train, means responsive to the speed of the driving shaft for engaging said clutch means, additional means including another clutch potentially providing in parallel to said gear train another driving connection of different ratio from that of said gear train, means responsive to the speed of the driven shaft for operating said last mentioned clutch, and means also responsive to the speed of the driven shaft for holding said first mentioned pick-up clutch means in engagement.

26. In an automatic transmission, in combination with substantially alined driving and driven shafts and a countershaft, a plurality of torque converting means carried partly by said countershaft and potentially providing driving connections of different ratios between said driving and driven shafts, a plurality of friction clutching means for controlling mechanical connections between the driving and driven shafts through different ones of said torque converting means, clutching means for connecting said shafts independently of said torque converting means, means responsive to the speed of the driving shaft for operating one of said clutching means, means responsive to the speed of the driven shaft, for operating the other of said clutching means, and means responsive to the speed of the driven shaft for preventing disengagement of said clutching means which is operable in response to the speed of the driving shaft.

27. In combination with an automatic transmission including driving and driven elements and a plurality of transmission members connectible and disconnectible to institute and interrupt driving connections of variant speed ratios between said elements, clutching means for controlling the connecting and disconnecting of said transmission members comprising a drum, means connecting said drum to at least one of said transmission members, friction clutching means within said drum and rotatable independently thereof, means connecting said clutching means to said driven element, releasable clutch means for clutching together the drum and driving member to institute a drive between said elements through said transmission members, and means for applying and releasing said clutching means within the drum to make and break a direct drive between said transmission members.

28. In an automatic transmission, in combination with driving and driven portions and a plurality of torque converting means therebetween of different ratios, including clutchable and releasable elements for controlling the effectiveness of said several means, clutching means for picking up and releasing said elements comprising a rotatable drum, a fluid operable clutch within the drum, dry centrifugal clutch means including a driving portion rotatable with and independently of said drum means for clutching and releasing the drum with respect to said driving portion, operating means for said clutch within the drum, means connecting said clutch within the drum with one of said elements, and means for providing a drive through said drum to the driven portion either independently of or in series with the clutch therewithin.

29. In combination with driving and drivable elements and a source of fluid under pressure, means for transmitting rotation from the former element to the latter, including transmission elements for potential driving connections therebetween at different ratios, a plurality of clutching means for rendering said transmission elements operative and inoperative, fluid-operable automatic means for actuating certain of said clutching means, independent mechanical actuating means for at least one of said clutching means, a gear train in series with said independently operable clutching means and with said driving and drivable elements, and personally operable shift means for freeing and engaging one of the gears of said train.

30. In an automatic torque converting and transmitting device in combination with driving and drivable elements and a plurality of engageable and disengageable transmission means providing potential driving connections therebetween at different ratios, a plurality of clutching means for engaging and disengaging said engageable and disengageable means and elements, automatic operating means for said clutching means including an automatically shiftable member, and personally operable releasing means connected to the operating means for each of said clutching means and operable step-wise to disengage overlappingly any or all of said clutching means at any time, independently of the position or movement of said automatically shiftable member.

31. In a torque converting and transmitting device, in combination with driving and drivable elements and a plurality of engageable and disengageable elements providing potential driving connections therebetween at different ratios, a plurality of clutching means for rendering such connections effective and ineffective, fluid actuable operating means for certain of said clutching means, other operating means for at least one of said clutching means including automatic controlling means responsive to the speed of one of said elements, valve means for controlling actuation of said fluid actuable operating means and so of the other clutching means, and governor means responsive to the speed of the other of said elements for regulating said valve means.

32. In combination with an automatic transmission including driving and driven elements and a plurality of transmission means connectible and disconnectible to institute and interrupt driving connections of variant speed ratios between said driving and driven elements, independent clutching means for controlling the connection and disconnection of each of said transmission means, said clutching means including a drum, friction clutching means reacting against the drum to establish a drive therethrough and through one of said transmission means, a plurality of clutch members within but rotatable independently of the drum, means connecting said clutch members to different ones of said transmission means, means for clutching to the drum at least one of said clutch members within the drum, and additional means within the drum for coupling said drum to said driven element, whereby drive may be transmitted between said driving and driven elements through one or both of said clutches to vary the driving ratio.

33. In an automatic transmission, in combination with driving and driven portions and a plurality of torque converting means therebetween of different ratios, including clutching means for controlling the effectiveness of said several means, said clutching means comprising a rotatable drum, a friction clutch outside the drum for clutching and releasing the drum relatively to said driving portion, a friction clutch within the drum connectible in series with at least a part of said torque converting means and with the clutch outside the drum, said torque converting means including a gear in series with both of said clutches and elements, and also including a gear train in series with both of said elements and one of said clutches, for providing drives between said elements at variant ratios.

34. In an automatic transmission, in combination with a driving member, a driven shaft, a plurality of torque converting means providing potential driving connections between said driving member and driven shaft at different torque ratios, and a plurality of friction pick-up clutches for rendering said torque converting means effective and ineffective including a high torque clutch and a low torque clutch, centrifugally controlled actuating means responsive to the speed of the driving member for engaging the high torque clutch to institute a drive between said driving member and driven shaft, actuating means responsive to the speed of the driven shaft for controlling the operation of the low torque clutch, the torque converting means transmitting the low torque drive being in series with both clutches, and automatic means for locking said high torque clutch in engagement during engagement of the low torque clutch.

35. In an automatic transmission, in combination with a driving member, a driven shaft, a plurality of torque converting means potentially providing driving connections between said driving member and driven shaft at predetermined torque ratios, and a plurality of friction pick-up clutches for rendering said torque converting means effective and ineffective, including a high torque clutch and a low torque clutch, means responsive to the speed of the driving member for engaging the high torque clutch when said member attains a predetermined speed, governing means responsive to the speed of the driven shaft for engaging and disengaging said low torque clutch, lag-imposing means associated with said governing means whereby said low torque clutch is disengaged thereby at a lower speed than that at which it is engaged, said low and high torque clutches being operable in series to transmit the low torque drive and said torque converting means including overrunning means, means operable by the governing means for locking said high torque clutch in engagement when the low torque clutch is engaged, said locking means being unaffected by the first mentioned speed responsive means but releasable with the low torque clutch.

36. In an automatic transmission, in combination with a driving member, a driven shaft, torque converting means potentially providing driving connections between said driving member and driven shaft at a predetermined torque ratio, a plurality of friction clutches, one of said clutches being for rendering said torque converting means effective or ineffective, and another thereof to effect a connection between said driving member and driven shaft at a different relative driving ratio, means responsive to the speed of the driving member for controlling the operation of the first described clutch, means responsive to the speed of the driven shaft for controlling the operation of the second described clutch, overrunning means in said torque converting means, said clutches being operable in series to transmit a drive of different ratio, and means operable with said second described clutch for locking the first described clutch independently of the first mentioned speed responsive means.

37. In combination with driving and drivable torque transmitting members and a source of pressure fluid, a plurality of transmission elements providing potential connections between said members at different ratios, fluid actuable means for engaging and disengaging said elements, control means for said fluid actuable means movable to effect engagement and release of said transmission elements and so of said several connections, comprising a valve for directing the delivery of pressure fluid to said means for engaging and disengaging the transmission elements, automatic actuating means for said control means and independent movable personally operable valvular overcontrol means enabling cutting off or supplying pressure fluid to any of said fluid operable means, and to more than one thereof at once, said overcontrol means including another valve also arranged to control such fluid delivery, said valves being independently movable, and the overcontrol valve being operable only manually, whereby the ratio between said elements may be changed, selected or maintained without the necessity of interrupting the transmission of torque therebetween.

38. In combination with driving and drivable torque transmitting members and a source of pressure fluid, a plurality of transmission elements providing potential connections between said members at different ratios, fluid actuable means for engaging and disengaging said elements, control means for said fluid actuable means comprising a valve for directing the delivery of pressure fluid to said means for engaging and disengaging the transmission elements, said valve being movable to effect engagement and release of said transmission elements and so of said several connections, automatic actuating means for said control means, and independently movable personally operable valvular overcontrol means comprising a second valve arranged at least partly in series with the first and also to control the delivery of such fluid, movement of one valve being unaffected by movement of the other, whereby by cutting off or supplying pressure fluid to any of said fluid operable means, and to more than one thereof at once, the ratio between said elements may be changed, selected or maintained without the necessity of interrupting the transmission of torque therebetween.

39. In an automatic transmission, in combination with driving and driven shafts and a countershaft, a plurality of torque converting gear trains carried partly by said countershaft and potentially providing driving connections of different speed ratios between said driving and driven shafts, a plurality of friction clutching means for rendering different ones of said torque converting means effective and ineffective, means responsive to the speed of the driving shaft for operating that one of said clutching means controlling a low speed drive, and fluid actuating means responsive to the speed of the driven shaft for controlling a plurality of others of such clutching means controlling driving connections of a higher speed ratio.

40. In an automatic transmission, in combination with a driving member, a driven shaft, a plurality of torque converting gear trains providing potential driving connections between said driving member and driven shaft at different torque ratios, and a plurality of friction pick-up clutches for individually rendering said gear trains effective and ineffective including a high torque clutch and a low torque clutch, operating means for engaging the high torque clutch to institute a drive between said driving member and driven shaft, including centrifugal means responsive to the speed of the driving member, operating means for the low torque clutch including means responsive to the speed of the driven shaft, and means controlled by said means responsive to the speed of the driven shaft, and independent of said centrifugal means, for holding said high torque clutch in engagement.

41. In an automatic transmission, in combination with driving and drivable elements, torque converting gearing potentially providing a plurality of driving connections therebetween at different torque ratios, a plurality of friction pick-up clutches for rendering different portions of said gearing operative and inoperative to transmit torque between said elements, one of said clutches comprising a high torque clutch and having one part connected to the driving element and another part connected to a portion of said gearing which is in turn connected to the drivable element, another of said clutches comprising an intermediate torque clutch and having one part connected to said driven element and another part connected to a part of said gearing which is connected to the high torque clutch, a direct drive clutch having a driving part connected to the driven part of the high torque clutch and having a driven part connected to the drivable element, operating means responsive to the speed of the driving element for engaging said high torque clutch, and locking means for thereafter maintaining it in engagement independently of the speed of said driving element, and means responsive to the speed of the drivable element for operating said intermediate torque and direct drive clutches.

42. In an automatic transmission, in combination with driving and drivable elements, torque converting gearing potentially providing a plurality of driving connections therebetween at different torque ratios, a plurality of friction pick-up clutches for rendering different portions of said gearing operative and inoperative to transmit torque between said elements, one of said clutches comprising a high torque clutch and having one part connected to the driving element and another part connected to a portion of said gearing which is in turn connected to the drivable element, another of said clutches comprising an intermediate torque clutch and having one part connected to said driven element and another part connected to a part of said gearing which is connected to the high torque clutch, a direct drive clutch having a driving part connected to the driven part of the high torque clutch and having a driven part connected to the drivable element, means responsive to the speed of the driving element for engaging said high torque clutch, means responsive to the speed of the drivable element for operating said intermediate torque and direct drive clutches and locking means also responsive to the speed of the drivable element for maintaining said high torque clutch in engagement independently of the speed of the said driving element.

43. In combination with driving and drivable shafts, torque converting means including a pair of adjacent casings, said shafts extending from opposite sides of said casings, a transmission shaft connecting and extending between said casings, a plurality of gear trains within one of the casings providing potential driving connections at different ratios between said driving and drivable shafts, a fluid reservoir and fluid-pumping means within said same casing, a plurality of friction clutches arranged in the other casing and concentric with the shafts, at least one of said clutches being connected to said gear trains and engageable and disengageable to control the driving connections provided thereby, fluid pressure-actuable means for operating said clutches, and fluid conducting means extending between said casings through said transmission shaft.

44. In combination with driving and drivable torque transmitting members and a source of pressure fluid, a plurality of transmission elements providing potential connections between said members at different ratios, releasable fluid actuable motivating means for engaging said elements, control means for said motivating means, movable to control engagement of said transmission elements and so of said several connections, automatic actuating means for said control means, and independently movable personally operable valvular over-control means having a cut-off portion movable to interrupt each of said fluid actuable motivating means, said valvular over-control means also having a portion bridging a part of said control means and simultaneously connectible with a plurality of said motivating means, thereby enabling cutting off or supplying pressure fluid to any of said fluid operable means, and to more than one thereof at once, whereby the ratio between said elements may be changed, selected, or maintained, without the necessity of interrupting the transmission of torque therebetween.

45. In an automatic torque converting and transmitting device, in combination with driving and drivable elements and a plurality of transmission means providing potential driving connections therebetween at different ratios, a plurality of pick-up clutches for engaging and disengaging said transmission means, automatic operating means for rendering said clutches effective and ineffective including speed responsive governing means, clutch operating means actuable thereby, and independent personally operable clutch controlling means movable independently of said governing means and connected to each of said clutches, said controlling means also having bridging means simultaneously connectible to all of said clutches, to enable selecting, changing or maintaining engagement of any or all of said clutches without interfering with the operation of the governor member.

46. In an automatic transmission, in combination with driving and drivable elements, torque converting gearing potentially providing a plurality of driving connections therebetween at different torque ratios, a plurality of friction pick-up clutches for rendering different portions of said gearing operative and inoperative to transmit torque between said elements, one of said clutches comprising a high torque clutch and having one part connected to the driving element and another part connected to a portion of said gearing which is in turn connected to the drivable element, another of said clutches comprising an intermediate torque clutch and having one part connected to said driven element and another part connected to a part of said gearing which is connected to the high torque clutch, a direct drive clutch having a driving part connected to the driven part of the high torque clutch and having a driven part connected to the drivable element, operating means responsive to the speed of the driving element for engaging said high torque clutch, additional operating means responsive to the speed of the drivable element for operating said intermediate torque clutch and direct drive clutch, and supplemental engaging means for said high torque clutch controlled by said last-named means, for maintaining said high torque clutch in engagement independently of the speed of the driving element when either said intermediate torque clutch or said direct drive clutch is in engagement.

47. In an automatic transmission, clutching means for controlling desired apparatus, comprising in combination with driving and driven elements, a rotatable drum, dry friction clutching means arranged outside the same for coupling the drum with one of said elements, wet friction clutching means within the drum enabling connection of the drum to the other of said elements, torque converting means connected in series with said drum and said other element to provide a drive between said elements at a predetermined torque ratio when the wet clutching means is disengaged, engagement of both of said clutching means rendering said torque converting means ineffective and providing a direct drive between said elements, and additional friction clutching means within the drum having driving and driven portions, the driven portion thereof being directly connected to said other element, and additional torque converting means in series with the driving portion thereof and with said drum.

ROBERT B. ASPINWALL.
TRACY B. TYLER.